US010051602B2

(12) United States Patent
Ryu et al.

(10) Patent No.: US 10,051,602 B2
(45) Date of Patent: *Aug. 14, 2018

(54) METHOD AND APPARATUS FOR MONITORING USER EQUIPMENT REACHABILITY IN WIRELESS COMMUNICATION SYSTEM

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Jaehyun Kim, Seoul (KR); Taehun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/489,685

(22) Filed: Apr. 17, 2017

(65) Prior Publication Data
US 2017/0273053 A1 Sep. 21, 2017

Related U.S. Application Data

(63) Continuation of application No. 15/081,542, filed on Mar. 25, 2016, now Pat. No. 9,668,236.
(Continued)

(51) Int. Cl.
H04W 4/00 (2018.01)
H04W 68/02 (2009.01)
(Continued)

(52) U.S. Cl.
CPC .............. H04W 68/02 (2013.01); H04W 8/04 (2013.01); H04W 8/06 (2013.01); H04W 8/18 (2013.01); H04W 68/005 (2013.01); H04W 76/28 (2018.02)

(58) Field of Classification Search
CPC ......... H04W 68/02; H04W 8/06; H04W 8/18; H04W 8/04; H04W 76/048; H04W 68/005
(Continued)

(56) References Cited

U.S. PATENT DOCUMENTS

2011/0292877 A1 12/2011 Yeoum et al.
2012/0115492 A1 5/2012 Liao
(Continued)

FOREIGN PATENT DOCUMENTS

EP 2785125 10/2014
WO 2013165168 11/2013

OTHER PUBLICATIONS

PCT International Application No. PCT/KR2016/003064, Written Opinion of the International Searching Authority dated Jul. 29, 2016, 5 pages.

Primary Examiner — Marcos Batista
(74) Attorney, Agent, or Firm — Lee Hong Degerman Kang Waimey

(57) ABSTRACT

Disclosed herein are a method and apparatus for monitoring UE reachability in a wireless communication system. A method for monitoring UE reachability may include receiving, by a Mobility Management Entity, a monitoring request message for UE reachability including a maximum response time from a Home Subscriber Server, detecting, by the MME, the UE reachability if it is expected that paging is able to be transmitted to UE when extended Discontinuous Reception is applied to the UE, and sending, by the MME, a UE reachability notification to a Service Capability Exposure Function before a next paging occasion of the UE, wherein the maximum response time may indicate a time during which the UE maintains a reachable state so that downlink data is reliably delivered to the UE, and wherein
(Continued)

an occasion when the UE reachability notification is transmitted may be determined by taking into consideration the maximum response time.

14 Claims, 24 Drawing Sheets

Related U.S. Application Data

(60) Provisional application No. 62/138,360, filed on Mar. 25, 2015, provisional application No. 62/186,386, filed on Jun. 30, 2015, provisional application No. 62/189,763, filed on Jul. 8, 2015, provisional application No. 62/234,679, filed on Sep. 30, 2015.

(51) Int. Cl.
　　*H04W 68/00*　　(2009.01)
　　*H04W 8/04*　　(2009.01)
　　*H04W 8/06*　　(2009.01)
　　*H04W 8/18*　　(2009.01)
　　*H04W 76/28*　　(2018.01)

(58) Field of Classification Search
　　USPC .......................................... 455/422; 370/338
　　See application file for complete search history.

(56) References Cited

U.S. PATENT DOCUMENTS

| | | | |
|---|---|---|---|
| 2014/0004890 A1* | 1/2014 | Cai | ................ H04L 67/24 455/466 |
| 2016/0286385 A1 | 9/2016 | Ryu et al. | |

\* cited by examiner (a) Control plane protocol stack (b) User plane protocol stack (a) Control plane protocol stack (b) User plane protocol stack

METHOD AND APPARATUS FOR MONITORING USER EQUIPMENT REACHABILITY IN WIRELESS COMMUNICATION SYSTEM

CROSS-REFERENCE TO RELATED APPLICATIONS

This application is a continuation of U.S. patent application Ser. No. 15/081,542, filed on Mar. 25, 2016, now U.S. Pat. No. 9,668,236, which claims the benefit of U.S. Provisional Patent Application Nos. 62/138,360, filed on Mar. 25, 2015, 62/186,386, filed on Jun. 30, 2015, 62/189,763, filed on Jul. 8, 2015 and 62/234,679, filed on Sep. 30, 2015, the contents of which are hereby incorporated by reference herein in its entirety.

BACKGROUND OF THE INVENTION

Field of the Invention

The present invention relates to a wireless communication system and, more particularly, to a method and apparatus for monitoring or supporting the reachability of user equipment and an apparatus supporting the same.

Discussion of the Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF THE INVENTION

An object of the present invention is to provide a method for efficiently providing a mobile terminating service to user equipment to which extended Discontinuous Reception (DRX) is applied for a power saving.

Another object of the present invention is to provide a method for monitoring the reachability of user equipment.

Yet another object of the present invention is to provide a method for sending downlink data to user equipment rapidly and efficiently.

The technical objects to attain in the present invention are not limited to the above-described technical objects and other technical objects which are not described herein will become apparent to those skilled in the art from the following description.

In an aspect of the present invention, there is provided a method for monitoring UE reachability in a wireless communication system, including receiving, by a Mobility Management Entity (MME), a monitoring request message for UE reachability including a maximum response time from a Home Subscriber Server (HSS), detecting, by the MME, the UE reachability if it is expected that paging is able to be transmitted to UE when extended Discontinuous Reception (DRX) is applied to the UE, and sending, by the MME, a UE reachability notification to a Service Capability Exposure Function (SCEF) before a next paging occasion of the UE, wherein the maximum response time may indicate a time during which the UE maintains a reachable state so that downlink data is reliably delivered to the UE, and wherein an occasion when the UE reachability notification is transmitted may be determined by taking into consideration the maximum response time.

In another aspect of the present invention, there is provided a Mobility Management Entity (MME) for monitoring UE reachability in a wireless communication system monitoring, including a communication module configured to send and receive signals and a processor configured to control the communication module. The processor may be configured to receive a monitoring request message for UE reachability including a maximum response time from a Home Subscriber Server (HSS), detect the UE reachability if it is expected that paging is able to be transmitted to UE when extended Discontinuous Reception (DRX) is applied to the UE, and send a UE reachability notification to a Service Capability Exposure Function (SCEF) before a next paging occasion of the UE, wherein the maximum response time may indicate a time during which the UE maintains a reachable state so that downlink data is reliably delivered to the UE, and wherein an occasion when the UE reachability notification is transmitted may be determined by taking into consideration the maximum response time.

Preferably, the maximum response time may be used to determine how early the UE reachability notification should be transmitted before the next paging occasion of the UE.

Preferably, the MME may start to watch that the UE enters connected mode when receiving the monitoring request message.

Preferably, the MME may send the UE reachability notification to the SCEF when the UE enters the connected mode before a next paging occasion of the UE.

Preferably, downlink data may be transmitted from a server to the UE when the UE reachability notification is delivered to the server via the SCEF.

Preferably, the monitoring request message may include an immediate delivery required parameter indicative of the immediate transition of the UE to connected mode.

Preferably, the MME may send the paging to the UE when receiving the monitoring request message comprising the immediate delivery required parameter.

In accordance with an embodiment of the present invention, UE terminating services can be effectively provide to UE to which extended DRX is applied.

Furthermore, in accordance with an embodiment of the present invention, UE reachability can be effectively monitored by detecting the UE reachability when it is expected that paging can be transmitted to UE.

Furthermore, in accordance with an embodiment of the present invention, downlink data can be transmitted to UE as soon as possible and reliably because an immediate delivery-required indicator is defined within a UE reachability monitoring request.

Furthermore, in accordance with an embodiment of the present invention, the time taken for UE to remain in connected mode or the time taken to maintain a user plane bearer can be minimized because a UE reachability notification is reported before the paging occasion of the UE.

Furthermore, in accordance with an embodiment of the present invention, a network-triggered service request procedure can be prevented from being unnecessarily performed in order to send downlink data to UE because a UE reachability notification is reported before the paging occasion of the UE.

Furthermore, in accordance with an embodiment of the present invention, downlink data can be prevented from being discarded before it is transmitted to UE and can be smoothly transmitted to the UE because a UE reachability notification is reported by taking into consideration of the response time of a server before the paging occasion of the UE.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION OF THE EMBODIMENTS

Figure 1:
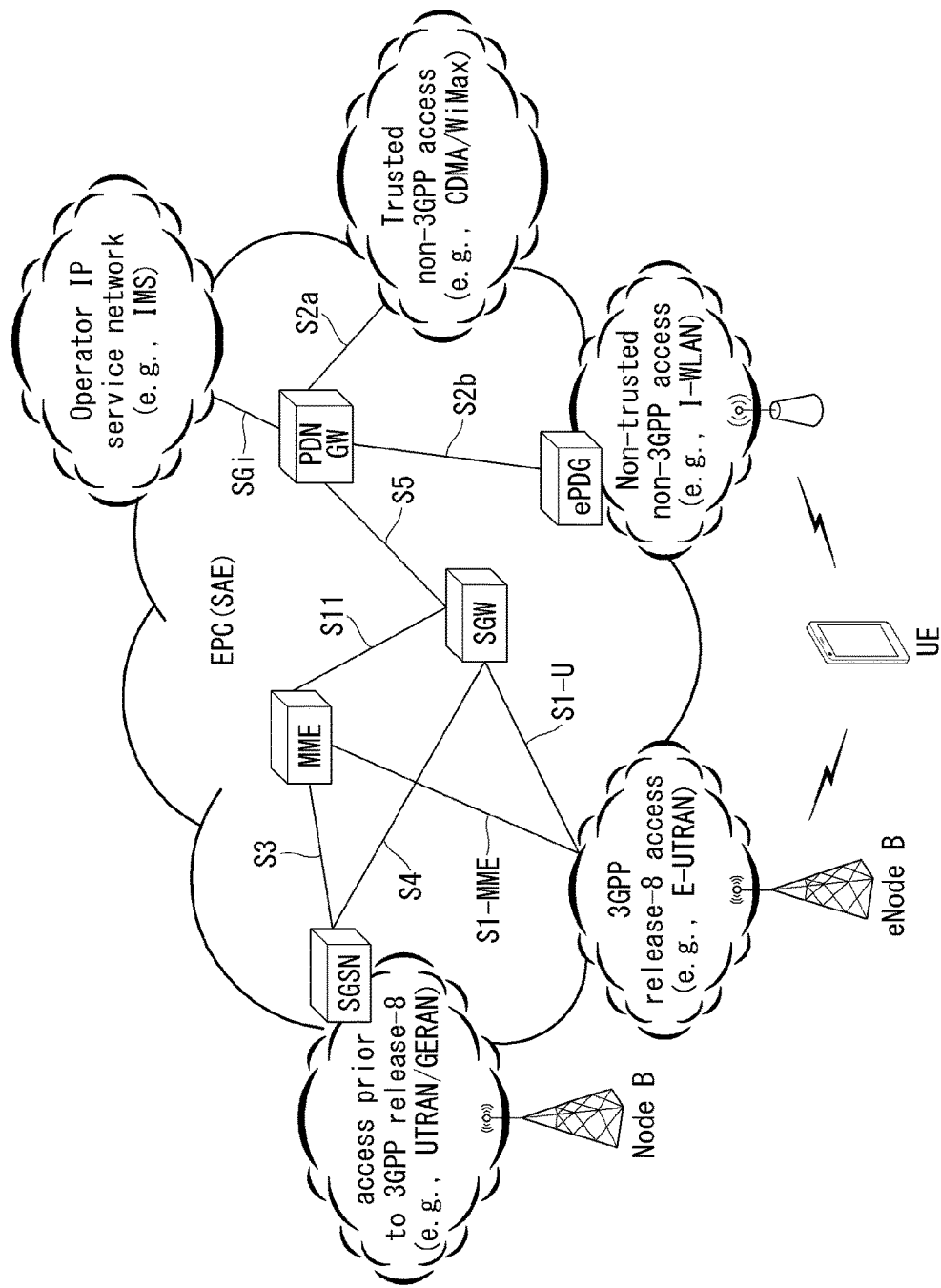
FIG. 1 is a diagram schematically illustrating an evolved packet system (EPS) to which the present invention may be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention may be embodied without the specific information.

In some cases, in order to avoid make the technical principle of the present invention obscure, well-known structures and devices will be omitted or may be illustrated in the form of block diagrams using the fundamental functions of the structures and devices.

In this document, a base station is regarded as a terminal node of a network, which performs communication directly with UE. In this document, particular operations regarded to be performed by the base station may be performed by an upper node of the base station depending on situations. In other words, it is apparent that in a network consisting of a plurality of network nodes including a base station, various operations performed for communication with UE may be performed by the base station or by network nodes other than the base station. The term Base Station (BS) may be replaced with a fixed station, Node B, evolved-NodeB (eNB), Base Transceiver System (BTS), or Access Point (AP). Furthermore, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understand the present invention, and the specific terms may be used in different ways without departing from the technical scope of the present invention.

The technology described below may be used in various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention may be supported by standard documents disclosed in at least one of wireless access systems including the IEEE 802, 3GPP, and 3GPP2 specifications. In other words, in the embodiments of the present invention, steps or parts omitted in order to clearly describe the technical principle of the present invention may be supported by the documents above. Furthermore, all of the terms disclosed in this document may be explained with reference to the standard documents.

To clarify the description, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network, such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): UE may be called a terminal, Mobile Equipment (ME), or Mobile Station (MS). UE may be a portable device, such as a notebook computer, mobile phone, Personal Digital Assistant (PDA), smart phone, or a multimedia device; or a fixed device, such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (e.g., a vending machine, meter, and so on) equipped with a communication function operating through a mobile communication network and performing an MTC function MTC server: a server on a network managing MTC terminals. It may be installed inside or outside a mobile communication network. It may provide an interface through which an MTC user may access the server. Furthermore, an MTC server may provide MTC-related services to other servers (in the form of Services Capability Server (SCS)) or the MTC server itself may be an MTC Application Server.

(MTC) application: services (to which MTC is applied) (e.g., remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application, such as remote metering, and low mobility is a feature intended for an MTC application with respect to an MTC terminal, such as a vending machine.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal.

External identifier: a globally unique identifier used by an external entity (e.g., an SCS or an Application Server)

of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider may use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS may perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN may be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

In what follows, the present invention will be described based on the terms defined above.

Overview of System to which the Present Invention May be Applied

FIG. 1 illustrates an Evolved Packet System (EPS) to which the present invention may be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (i.e., in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between pieces of UE having IP capabilities may be established through an IP-based base station (e.g., eNodeB), EPC, and application domain (e.g., IMS). In other words, the EPC provides the architecture essential for implementing end-to-end IP services.

The EPC comprises various components, where FIG. 1 illustrates part of the EPC components, including a Serving Gateway (SGW or S-GW), a Packet Data Network Gateway (PDN GW or PGW or P-GW), Mobility Management Entity (MME), a Serving GPRS Supporting Node (SGSN), and an enhanced Packet Data Gateway (ePDG).

The SGW operates as a boundary point between the Radio Access Network (RAN) and the core network and maintains a data path between the eNodeB and the PDN GW. Furthermore, when the UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Furthermore, the SGW may act as an anchor point for mobility between the E-UTRAN and other 3GPP networks (RAN defined before the 3GPP release 8, for example, the UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW may support policy enforcement features, packet filtering, charging support, and so on. Furthermore, the PDN GW may act as an anchor point for mobility management between the 3GPP network and non-3GPP networks (e.g., an unreliable network, such as the Interworking Wireless Local Area Network (I-WLAN), or reliable networks, such as the Code Division Multiple Access (CDMA) network and Wimax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Furthermore, the MME performs such functions as security procedures, terminal-to-network session handling, idle terminal location management, and so on.

The SGSN deals with all kinds of packet data including the packet data for mobility management and authentication of the user with respect to other 3GPP networks (e.g., the GPRS network).

The ePDG acts as a security node with respect to an unreliable, non-3GPP network (e.g., I-WLAN, WiFi hotspot, and so on).

As described with respect to FIG. 1, UE having the IP capability may access the IP service network (e.g., the IMS) that a service provider (i.e., an operator) provides, via various components within the EPC based not only on the 3GPP access but also on the non-3GPP access.

Furthermore, FIG. 1 illustrates various reference points (e.g., S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points may be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b correspond to non-3GPP interfaces. S2a is a reference point which provides reliable, non-3GPP access, related control between PDN GWs, and mobility resources to the user plane. S2b is a reference point which provides related control and mobility resources to the user plane between an ePDG and a PDN GW.

Figure 2:
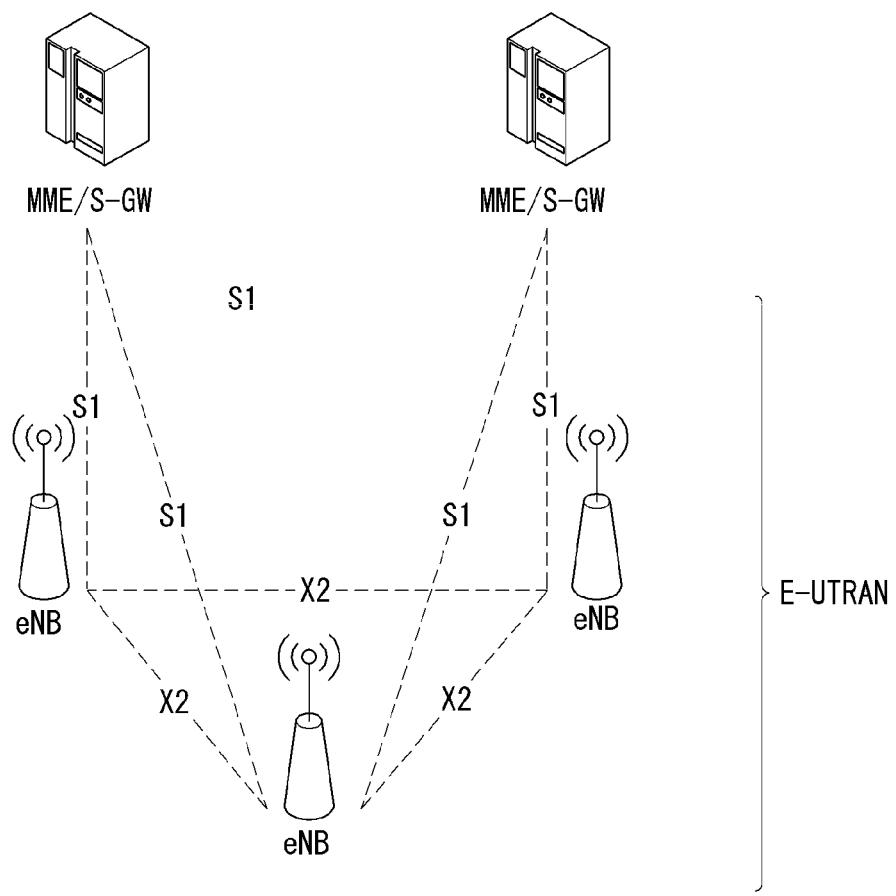
FIG. 2 illustrates an example of evolved universal terrestrial radio access network structure to which the present invention may be applied.

FIG. 2 illustrates one example of an Evolved Universal Terrestrial Radio Access Network (E-UTRAN) to which the present invention may be applied.

The E-UTRAN system is an evolved version of the existing UTRAN system, for example, and is also referred to as 3GPP LTE/LTE-A system. Communication network is widely deployed in order to provide various communication services, such as voice (e.g., Voice over Internet Protocol (VoIP)), through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two adjacent eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions, such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

Figure 3:
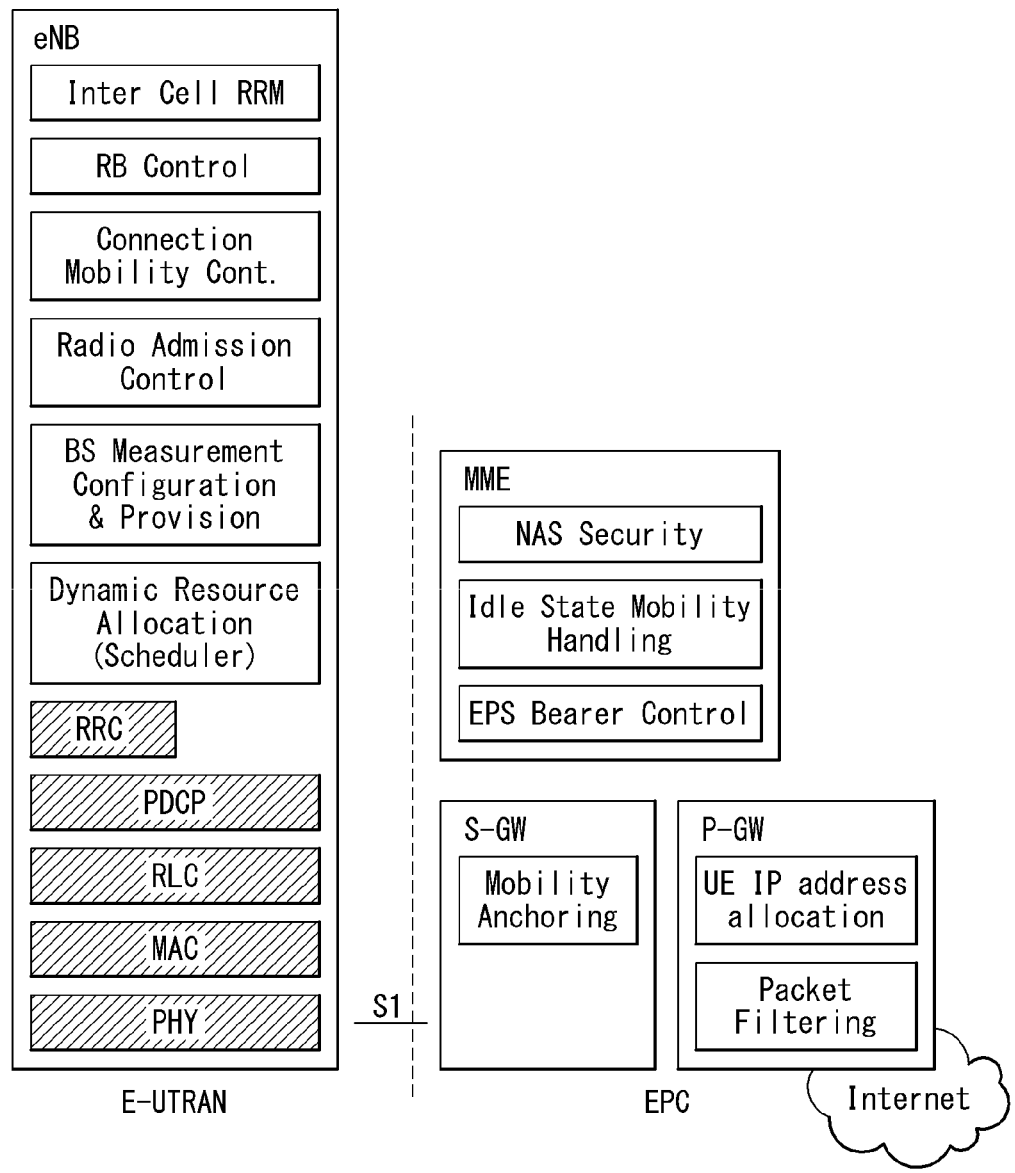
FIG. 3 illustrates a structure of E-UTRAN and EPC in a wireless communication system to which the present invention may be applied.

FIG. 3 illustrates the structure of an E-UTRAN and EPC in a wireless communication system to which the present invention may be applied.

Referring to FIG. 3, an eNB may perform the functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

Figure 4:
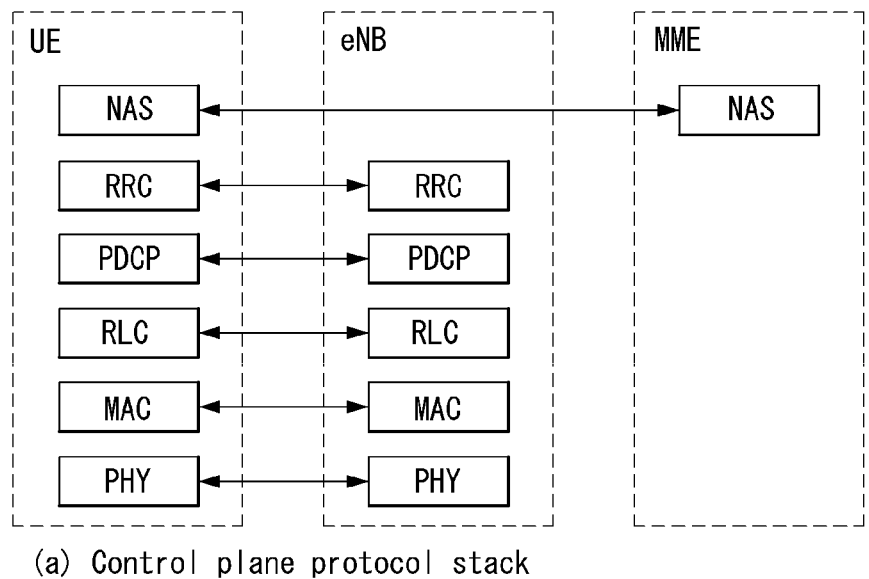
FIG. 4 illustrates a structure of a radio interface protocol between UE and E-UTRAN in a wireless communication system to which the present invention may be applied.
Figure 4:
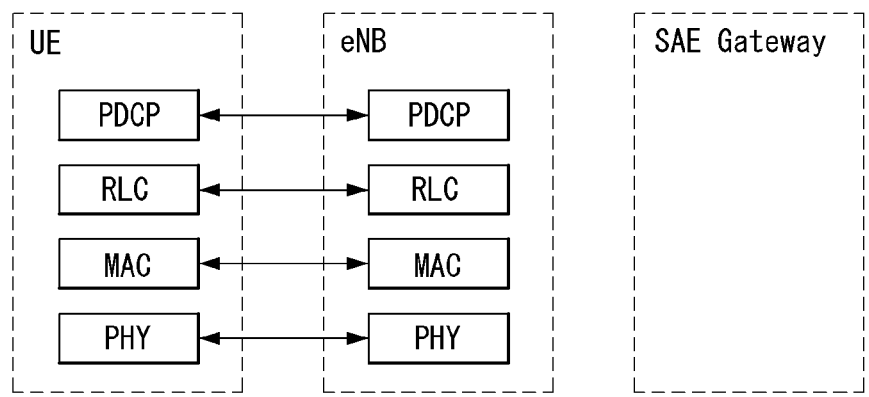

FIG. 4 illustrates a radio interface protocol structure between UE and an E-UTRAN in a wireless communication system to which the present invention may be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), that is, the first layer (L1), provides information transfer service to upper layers by using a physical channel. The physical layer is connected to the Medium Access Control (MAC) layer located at the upper level through a transport channel through which data is transmitted between the MAC layer and the physical layer. Transport channels are classified according to how and with which features data is transmitted through the radio interface. Furthermore, data is transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Furthermore, the PDCCH may carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information, such as HARQ ACK/NACK, with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Furthermore, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, if MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets, such as the IPv4 (Internet Protocol version 4) or IPv6 (Internet Protocol version 6) packets, through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from UE to a network include a Random Access Channel (RACH) transmitting the initial control message and an Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc.

The traffic channels include a dedicated traffic channel (DTCH), a Multicast Traffic Channel (MTCH), etc. The PCCH is a downlink channel that delivers paging information, and is used when a network does not know the cell where UE belongs. The CCCH is used by UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by UE that has RRC connection delivering dedicated control information between UE and network. The DTCH is a point-to-point channel which is dedicated to UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

Figure 5:
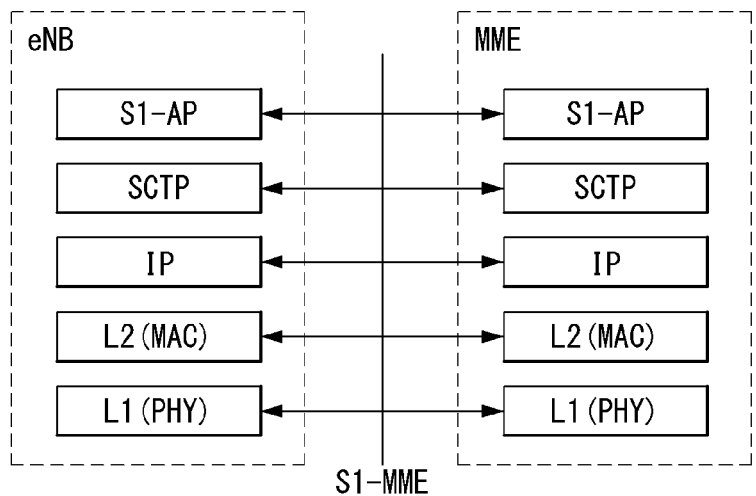
FIG. 5 illustrates a structure of an S1 interface protocol to which the present invention may be applied.
Figure 5:
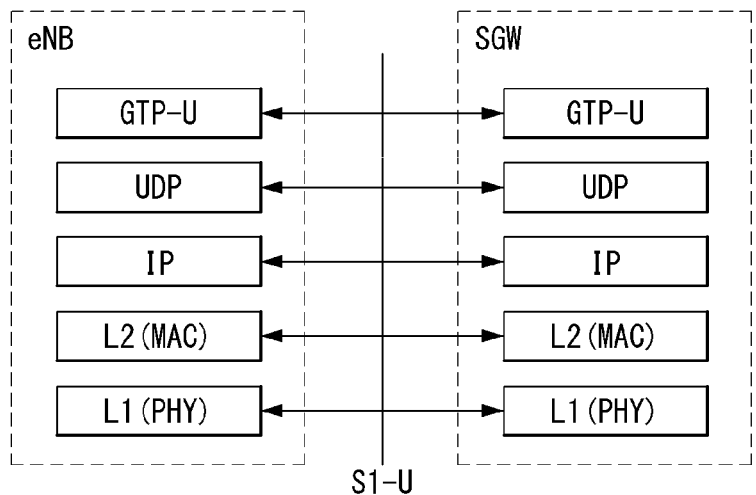

FIG. 5 illustrates an S1 interface protocol structure in a wireless communication system to which the present invention may be applied.

FIG. 5(*a*) illustrates the control plane protocol stack in the S1 interface, and FIG. 5(*b*) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying UE-specific S1-MME signaling transmission bearer. The communication context identifier is delivered within each S1-AP message.

If the S1 signaling transport layer notifies the S1AP layer of disconnection of signaling, the MME changes the state of the UE which has used the corresponding signaling connection to ECM-IDLE state. Furthermore, the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

Figure 6:
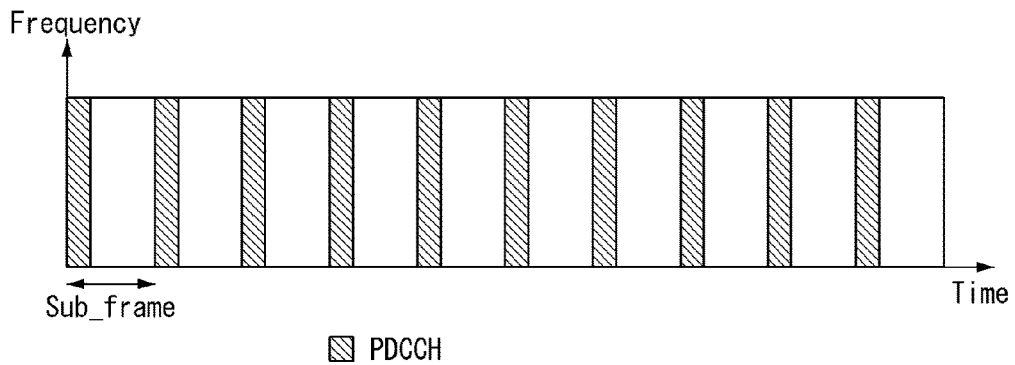
FIG. 6 is a diagram schematically illustrating a structure of physical channel in a wireless communication system to which the present invention may be applied.

FIG. 6 is a diagram schematically illustrating a structure of physical channel in a wireless communication system to which the present invention may be applied.

Referring to FIG. 6, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

EMM and ECM State

Hereinafter, EPS Mobility Management (EMM) and EPS Connection Management (ECM) states will be described.

Figure 7:
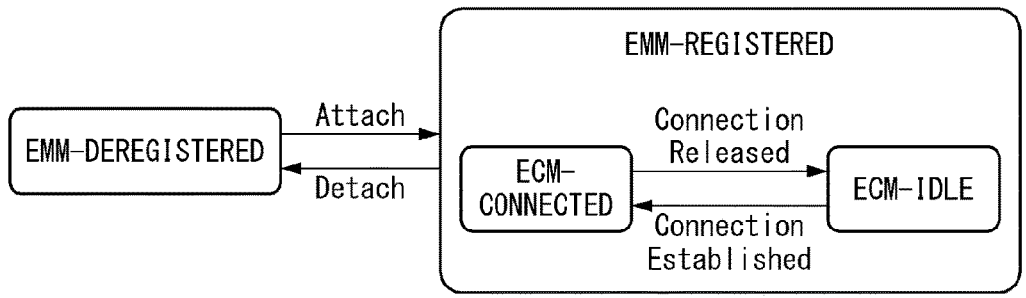
FIG. 7 is a diagram illustrating states of EMM and ECM in a wireless communication system to which the present invention may be applied.

FIG. 7 illustrates an EMM and ECM states in a wireless communication system to which the present invention may be applied.

With reference to FIG. 7, to manage mobility of the UE in the NAS layer defined in the control planes of the UE and the MME, EMM-REGISTERED and EMM-DEREGISTERED states may be defined according to the UE is attached to or detached from a network. The EMM-REGISTERED and the EMM-DEREGISTERED states may be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Furthermore, if UE is powered off or the UE fails to establish a radio link (i.e., a packet error rate for a radio link exceeds a reference value), the UE is detached from the network and makes a transition to the EMM-DEREGISTERED state.

Likewise, to manage signaling connection between the UE and the network, ECM-CONNECTED and ECM-IDLE states may be defined. The ECM-CONNECTED and ECM-IDLE states may also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, if RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network may identify the UE staying in the ECM-CONNECTED state at the level of cell unit and may control the UE in an effective manner.

Meanwhile, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE may receive a broadcast signal of system information and paging information by monitoring a paging signal at a specific paging occasion for each piece of UE-specific paging DRX cycle.

When the UE is in the ECM-IDLE state, the network does not carry context information of the UE. Therefore, the UE staying in the ECM-IDLE state may perform a mobility-related procedure based on the UE, such as cell selection or cell reselection, without necessarily following an order of the network. If the position of the UE differs from the position recognized by the network while the UE is in the ECM-IDLE state, the UE may inform the network of the corresponding position of the UE through a Tracking Area Update (TAU) procedure.

Meanwhile, when the UE is in the ECM-CONNECTED state, mobility of the UE is managed by an order of the network. While the UE stays in the ECM-CONNECTED state, the network knows to which cell the UE currently belongs. Therefore, the network may transit and/or receiver data to or from the UE, control mobility of the UE, such as handover, and perform cell measurement with respect to neighboring cells.

As described above, the UE has to make transition to the ECM-CONNECTED state in order to receive a general mobile communication service, such as a voice or data communication service. When the UE is first powered on, the UE in its initial state stays in the ECM-IDLE state as in the EMM state, and if the UE successfully registers to the corresponding network through an initial attach procedure, the UE and the MEE make a transition to the ECM connection state. Furthermore, if UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

EPS Bearer

Figure 8:
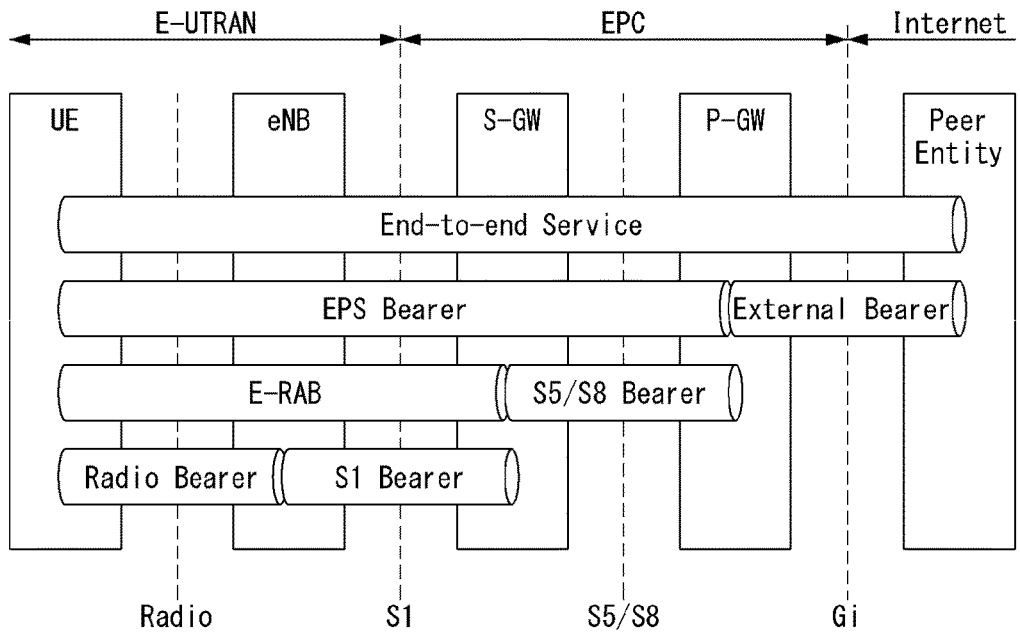
FIG. 8 illustrates a bearer structure in a wireless communication system to which the present invention may be applied.

FIG. 8 illustrates a bearer structure in a wireless communication system to which the present invention may be applied.

When the UE is connected to a Packet Data Network (PDN) (which is the peer entity of FIG. 8), PDN connection is established, which may be called an EPS session. The PDN provides a service function, such as the Internet or IP Multimedia Subsystem (IMS), through an external or internal IP network of the service provider.

An EPS session comprises one or more EPS bearers. The EPS bearer refers to the transmission path of traffic generated between the UE and the PDN GW for the EPS to deliver user traffic. One or more EPS bearers may be set up for each piece of UE.

Each EPS bearer may be classified into E-UTRAN Radio Access Bearer (E-RAB) or S5/S8 bearer, and the E-RAB may be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs may be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs may be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer may be one of two types: a default bearer and a dedicated bearer. The UE may have one default bearer and one or more dedicated bearers for each PDN. The minimum basic bearer that the EPS session may have with respect to one PDN is called default bearer.

The EPS bearer may be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. In this case, not all the bearers acting as default bearers with respect to the UE across the whole interval are not activated; the S5 bearer connected directly to the PDN is maintained, and the E-RAB bearer related to radio resources (i.e., DRB and S1 bearer) is released. Furthermore, if new traffic is generated in the corresponding PDN, the E-RAB bearer is reconfigured to deliver traffic.

If the UE attempts to use a service of which the Quality of Service (QoS) (e.g., Video on Demand (VoD) service) cannot be supported by the default bearer while using a service (e.g., the Internet) through the default bearer, a dedicated bearer is created when the UE demands the high QoS service. In case there is no traffic from the UE, the dedicated bearer is released. The UE or the network may create a plurality of dedicated bearers depending on needs.

Depending on which service the UE uses, the IP flow may have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (e.g., a QoS policy, gate status, and charging method).

The PCC rule is determined in SDF unit. In other words, according to the service that the UE uses, the IP flow may have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules may be classified by dynamic PCC rules and pre-defined PCC rules. A dynamic PCC rule is provided dynamically from the PCRF to the P-GW when the EPS session is established or modified. Meanwhile, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar may be pre-configured by one of integer values ranging from 1 to 9.

The main purpose of the ARP is to determine whether a request for an establishment or modification of a bearer may be accepted or refused when only limited amount of resources are available. Furthermore, the ARP may be used for the eNB to determine which bearer(s) to drop under the situation of limited resources (e.g., handover).

EPS bearers may be classified to Guaranteed Bit Rate (GBR)-type bearers and non-GBR type bearers depending on QCI resource type. A default bearer is always a non-GBR type bearer, but a dedicated bearer may be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. Meanwhile, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers may be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

Figure 9:
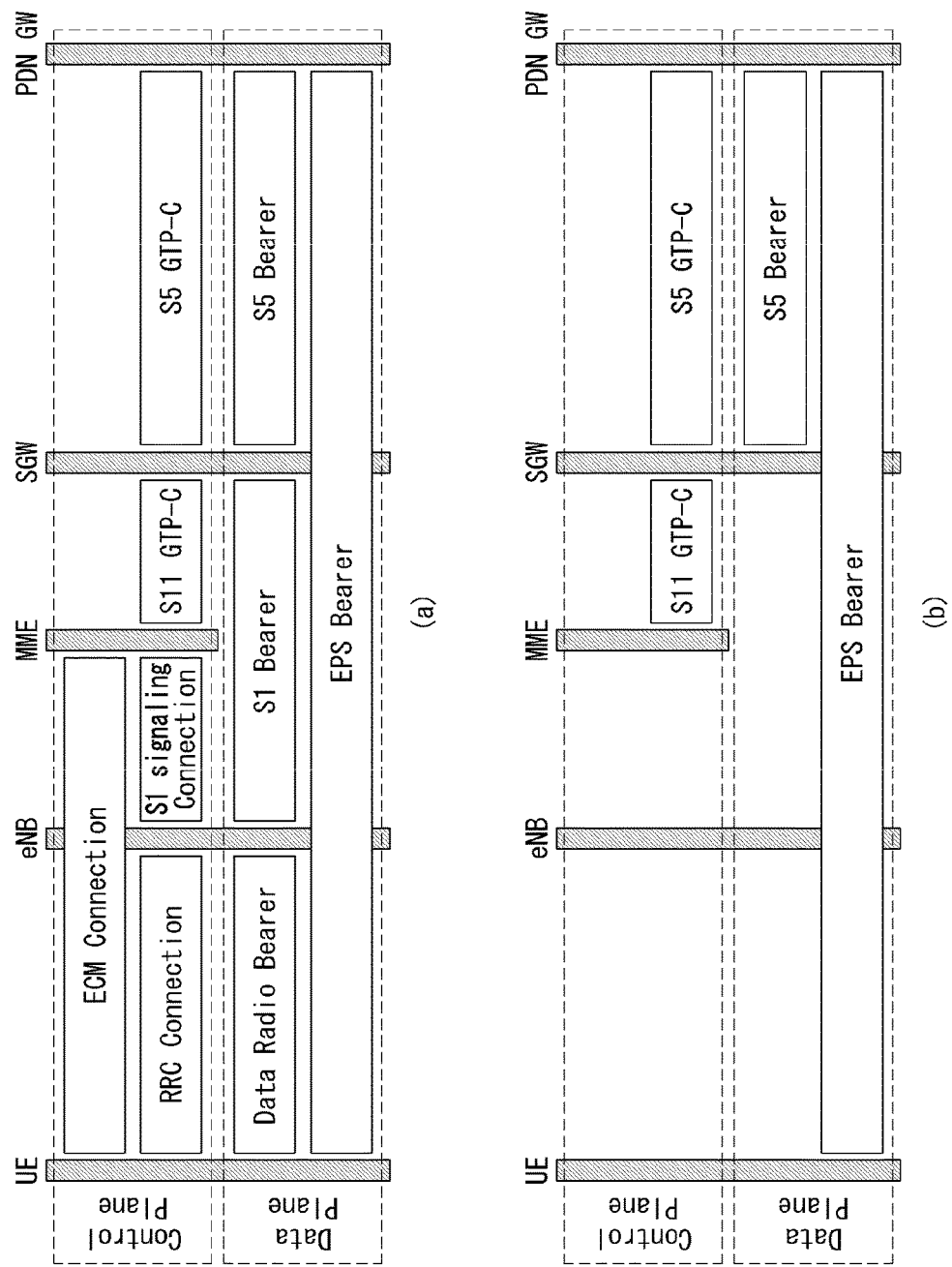
FIG. 9 is a diagram illustrating a transmission path of a control plane and a user plane in an EMM registered state in a wireless communication system to which the present invention may be applied.

FIG. 9 illustrates transmission paths of a control plane and a user plane in an EMM registration state in a wireless communication system to which the present invention may be applied.

FIG. 9(a) illustrates ECM-CONNECTED state, and FIG. 9(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 9(a), in the ECM-CONNECTED state where user traffic is present, NAS signaling connection, namely, ECM connection (RRC connection and S1 signaling connection) is established. Furthermore, S11 GTP-C (GPRS Tunneling Protocol Control Plane) connection is established between the MME and the SGW, and S5 GTP-C connection is established between the SGW and the PDN GW.

Furthermore, in the ECM-CONNECTED state, all of the DRB, S1 bearer, and S5 bearer are set up (i.e., radio or network resources are allocated).

As shown in FIG. 9(b), in the ECM-IDLE state where there is no user traffic, the ECM connection (i.e., RRC connection and S1 signaling connection) is released. However, the S11 GTP-C connection between the MME and the SGW; and the S5 GTP-C connection between the SGW and the PDN GW are retained.

Furthermore, in the ECM-IDLE state, the DRB and the S1 bearer are all released, but the S5 bearer is retained (i.e., radio or network resources are allocated).

Figure 10:
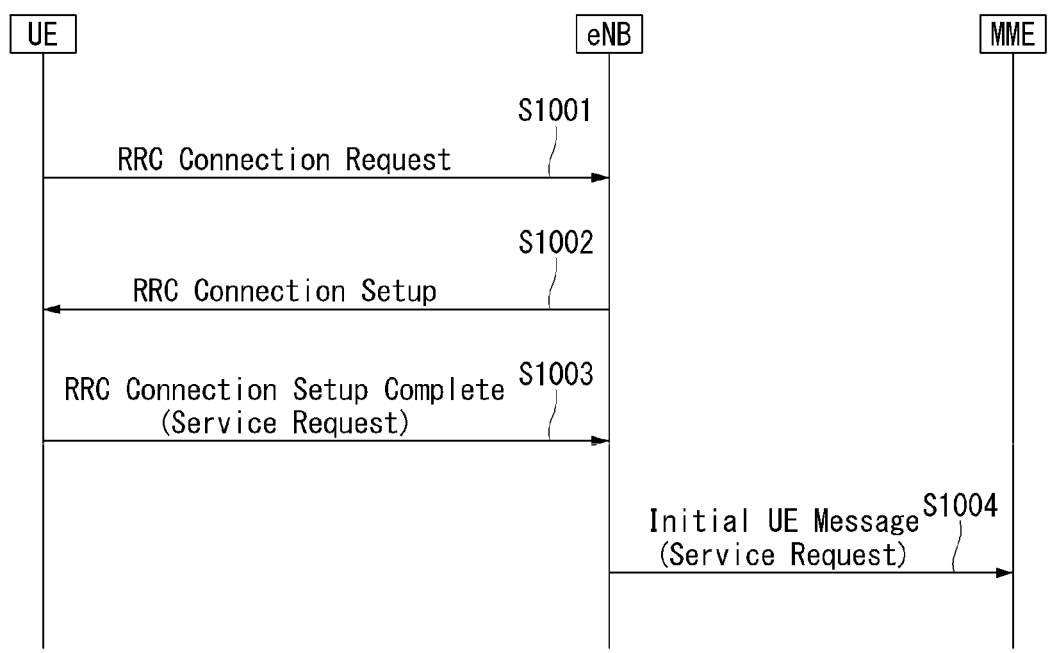
FIG. 10 is a diagram illustrating an ECM connection establishment procedure in a wireless communication system to which the present invention may be applied.

FIG. 10 is a diagram illustrating an ECM connection establishment procedure in a wireless communication system to which the present invention may be applied.

Referring to FIG. 10, UE transmits a RRC connection request message to an eNB for requesting RRC connection (S1001).

The RRC connection request message includes UE Identity (e.g., SAE temporary mobile subscriber identity (S-TMSI) or random ID) and an establishment cause.

The establishment cause may be determined according to NAS procedure (e.g., attach, detach, tracking area update, service request and extended service request).

The eNB transmits a RRC connection setup message to the UE in response to the RRC connection request message (S1002).

After receiving the RRC connection setup message, the UE switches to RRC_CONNECTED mode.

The UE transmits a RRC connection setup complete message to the eNB for verifying successful completion of the RRC connection establishment (S1003).

The UE transmits the RRC connection setup complete message with an NAS message (e.g., an initial attach message, a service request message) being included to the eNB.

The eNB acquires the service request message from the RRC connection setup complete message, and transmits this to the MME through the Initial UE message, which is S1AP message (S1004).

The control signals between the eNB and the MME may be delivered through S1AP message through S1-MME interface. The S1AP message is delivered through S1 signaling connection for each user, and the S1 signaling connection is defined by an identity pair (i.e., eNB UE S1AP ID and MME UE S1AP ID) such that the eNB and the MME distinguish the UE.

The eNB transmits the Initial UE message including eNB UE S1AP ID by allocating eNB UE S1AP ID, and the MME setup S1 signaling connection between the eNB and the MME by allocating MME S1AP UE ID by receiving the Initial UE message.

Random Access Procedure

Hereinafter, a random access procedure which is provided in a LTE/LTE-A system will be described.

The random access procedure is used for UE to obtain the UL synchronization with an eNB or to be allocated with UL radio resource. After turning on the power of UE, the UE acquires the DL synchronization with an initial cell and receives the system information. The UE gains the information of the set of usable random access preamble and that of the radio resource which is used for the transmission of random access preamble. The radio resource that is used for the transmission of random access preamble may be specified as the combination of at least one subframe index and an index on the frequency domain. The UE transmits the random access preamble that is randomly selected from the set of random access preamble, and the eNB that receives the random access preamble transmits the timing alignment (TA) value for the UL synchronization to the UE through the random access response. The UE acquires the UL synchronization in this way.

The random access procedure shows common in frequency division duplex (FDD) and time division duplex (TDD). The random access procedure is irrelevant to the cell size, and the number of serving cell in case of the carrier aggregation being configured.

First, the following shows the case that UE performs the random access procedure.

- When the UE performs an initial access in a RRC idle state without any RRC connection to an eNB
- When the UE performs a RRC connection re-establishment procedure
- When the UE tries to an initial access to a target cell in a handover procedure
- When a random access procedure is requested by the order from eNB
- When there is any data that is going to be transmitted to DL in a non-synchronized condition during the RRC connected state
- When there is any data that is going to be transmitted to UL in a non-synchronized condition and in a condition that the radio resource designated for requesting the radio resource is not allocated during the RRC connected state When UE positioning is performed in a condition that timing advance is required during the RRC connected state When restoration procedure is performed in a radio link failure or handover failure In 3GPP Rel-10, it is considered that the timing advance (TA) value that is applicable to a specific cell (e.g., PCell) in a wireless access system that supports the carrier aggregation is applied to a plurality of cells in common. However, the UE may aggregate a plurality of cells that are included in different frequency bands (i.e., spaced apart on the frequency domain) or a plurality of cells that have different propagation characteristics. In addition, in case of a specific cell, for the extension of coverage or the removal of coverage hole, in a condition that small cells, such as a remote radio header (RRH) (i.e., a repeater), a femto cell, a pico cell, or a secondary eNB (SeNB), are arranged in the cell, the UE performs a communication with the eNB (i.e., macro eNB), in case of performing the communication with the secondary eNB through another cell, a plurality of cell may have different characteristics of the propagation delay. In this case, if the UL transmission is performed in a way that one TA value is commonly applied to a plurality of cells, it may profoundly affect the synchronization of UL signals that are transmitted on a plurality of cells. Accordingly, it may be desired to have a plurality of TAs in a condition of the CA that a plurality of cells are aggregated, and in 3GPP Rel-11, considered to allocate the TA independently in a specific cell group unit for supporting multiple TA. It is referred to as TA group (TAG), the TAG may include one or more cell(s), and the same TA may be commonly applied in one more cell(s) that are included in the TAG. For supporting the multiple TA, the MAC TA command control element is configured with 2-bit TAG ID and 6-bit TAG command field.

The UE on which a carrier aggregation is configured performs the random access procedure in case that the random access procedure previously described is required in connection with PCell. In case of TAG (i.e., primary TAG (pTAG)) to which PCell belongs, the TA, which is determined based on PCell same as the existing case, or regulated through the random access procedure that accompanies PCell, may be applied to all the cells within the pTAG. Meanwhile, in case of TAG (i.e., secondary TAG (sTAG)) that is configured with SCells only, the TA, which is determined based on a specific SCell within sTAG, may be applied to all the cells within the relevant sTAG, and in this time, the TA may be acquired through the random access procedure by being initiated by the eNB. Particularly, the SCell in the sTAG is set to be RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using Random Access Radio Network Temporary Identifier (RA-RNTI). The TA that is determined based on SCell that successfully completes the random access may be applied to all the cells in the relevant sTAG by the UE. Like this, the random access procedure may be performed in SCell as well in order to acquire timing alignment of the sTAG to which the relevant SCell belongs.

The LTE/LTE-A system provides both of the contention-based random access procedure that the UE randomly selects to use one preamble in a specific set and the non-contention-based random access procedure that the eNB uses the random access preamble that is allocated to a specific UE. However, the non-contention-based random access procedure may be used only for the handover procedure, the UE positioning, case of being requested by the order of eNB and/or the timing advance alignment for the sTAG. After the random access procedure is completed, a normal UL/DL transmission is made.

In the meantime, relay node (RN) also supports both of the contention-based random access procedure and the non-contention-based random access procedure. When the relay node performs the random access procedure, the RN suspends the RN subframe configuration at the moment. That is, it means that the RN subframe configuration is temporarily terminated. But, the RN subframe configuration is initiated at the time when the random access procedure has been successfully completed.

Figure 11:
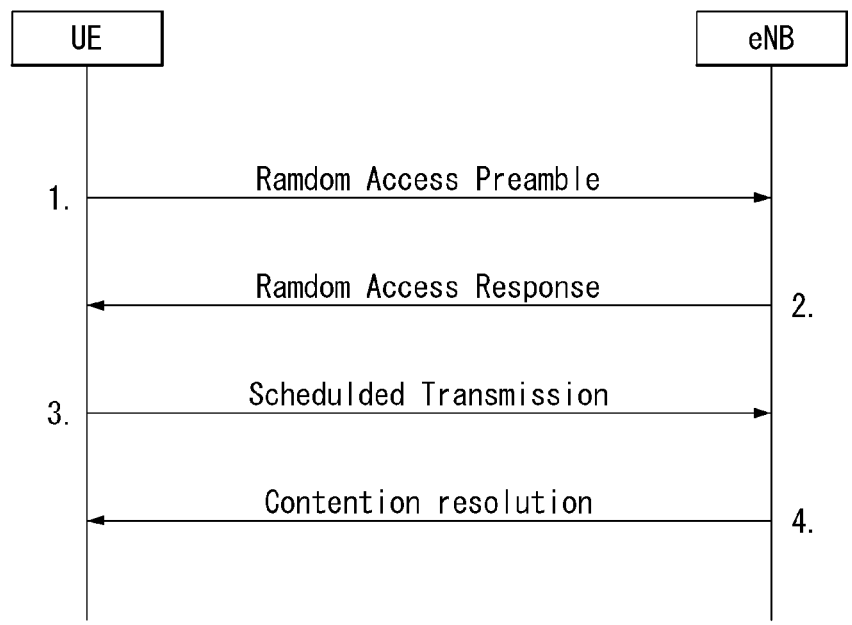
FIG. 11 is a diagram for describing the contention-based random access procedure in the wireless communication system to which the present invention may be applied.

FIG. 11 is a diagram for describing the contention-based random access procedure in the wireless communication system to which the present invention may be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The random access preamble is transmitted by 6 bits in the RACH transmission channel, and the 6-bit consists of 5-bit random identity for identifying the RACH transmitted UE and the rest 1-bit (e.g., indicating the size of Msg 3) for representing additional information.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH. It is desirable to include the information of UE that is to receive the PDSCH, frequency and the time information of the PDSCH radio resource, and transmission type of the PDSCH, etc in the PDCCH. As described above, if succeeding in detecting the PDCCH that is transmitted to the UE itself, the UE may receive properly the random access response that is transmitted on the PDSCH according to the PDCCH information.

The random access response window represents the maximum time duration when the UE that transmits the preamble is waiting for the random access response message. The random access response window has the length of 'raResponseWindowSize', which starts from the subframe after 3 subframes from the last subframe in which the preamble is transmitted. That is, the UE is waiting for receiving the random access response during the random access window secured after 3 subframes from the subframe in which the preamble transmission is completed. The UE may acquire the random access window size ('ra-ResponseWindowsize') parameter value through the system information, and the random access window size may be determined as a value from 2 to 10.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

As described above, the reason why the random access preamble index is needed in the random access response is that one random access response may include the random access response information for one or more UEs, and so there is required an index to instruct for which UE the above UL grant, TC-RNTI, and TAC are available.

(3) Message 3 (Msg 3)

If the UE receives the random access response that is effective with the UE itself, the UE processes the information included in the random access response respectively. That is, the UE applies TAC and stores TC-RNTI. Furthermore, by using UL grant, the UE transmits the data stored in the buffer of UE or the data newly generated to the eNB. In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. In the content based random access procedure, the eNB may not identify which UEs perform the random access procedure, but the eNB is required to identify the UE in order to solve the collision later on.

There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (e.g., S-TMSI or random number). Normally the above unique identifier is longer that C-RNTI.

For the transmission on the UL SCH, the UE-specific scrambling is used. If the UE has been allocated C-RNTI, the scrambling is performed based on the C-RNTI. However, if the UE has not been allocated C-RNTI yet, the scrambling is not performed based on the C-RNTI but uses TC-RNTI that is received from the random access response instead. If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (i.e., S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (i.e., S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive UE-specific message by using the C-RNTI.

The following is a description of the method for collision resolution in the random access.

The reason why a collision is occurred in performing the random access is that the number of random access preamble is limited basically. That is, it is not available that the eNB assigns a unique random access preamble for the UE to all the UEs, and the UE should randomly select one among the common random access preambles and transmit. According to this, a case is occurred that two or more UEs select the identical random access preamble through the identical radio resource (PRACH resource) and transmit, but the eNB recognizes it as one random access preamble that is transmitted from one UE. Accordingly, the eNB transmits the random access response to the UE and the random access response is supposed to be received by one UE. However, as described above, as there is a possibility that a collision is occurred, two or more UEs are going to receive one random access response, and according to this, each piece of UE performs an operation by the receipt of random access response. That is, there is a problem that two or more UEs transmit different data to the same radio resource by using one UL grant included in the random access response. According to this, the data transmission might be all failed, and depending on the location of UEs or transmission power, the data of a specific UE only may be received by the eNB.

In the latter case, as all of the two or more UEs assume that the data transmission of its own are succeeded, the eNB should inform the fact to the corresponding UEs that they are failed in contention. That is, what to inform the fact of the failure or success in contention is referred to as contention resolution.

There are two ways of contention resolution. The one is to use the contention resolution timer, and the other is to transmit the identifier of successful UE to UEs. The former is applied to the case that the UE already has a unique C-RNTI before the random access procedure. That is, the UE that already has the C-RNTI transmits the data including the C-RNTI of itself according to the random access response and operates the contention resolution timer. Furthermore, if the PDCCH information that is addressed by the C-RNTI of its own is received before the contention resolution timer is terminated, the UE determines itself to succeed in the contention and normally terminates the random access. In the contrary, if the PDCCH information that is addressed by the C-RNTI of its own is not received before the contention resolution timer is terminated, the UE determines itself to fail in the contention and reinitiates the random access procedure, or informs a higher layer of the failure. In the latter case of the ways of contention resolution, that is, the case that is to transmit the identifier of successful UE, is used for what the UE does not have a unique C-RNTI prior to the random access procedure. That is, in case that the UE itself does not have C-RNTI, the UE transmits including a higher identifier (S-TMSI or random number) more than the C-RNTI of data according to the UL Grant information included in the random access response, and operates the contention resolution timer. If the data including the higher identifier of its own is transmitted to DL-SCH before the contention resolution timer is terminated, the UE determines that the random access procedure is successful. Meanwhile, in case that the data including the higher identifier of its own is not transmitted to DL-SCH before the contention resolution timer is terminated, the UE determines that the random access procedure is failed.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. Furthermore, the UE transmits the allocated random access preamble to the eNB as the message 1, and terminates the random access procedure by receiving the random access response from the eNB.

Service Request Procedure

Generally, UE-triggered service request procedure is performed when trying to start new service initiated by UE.

Figure 12:
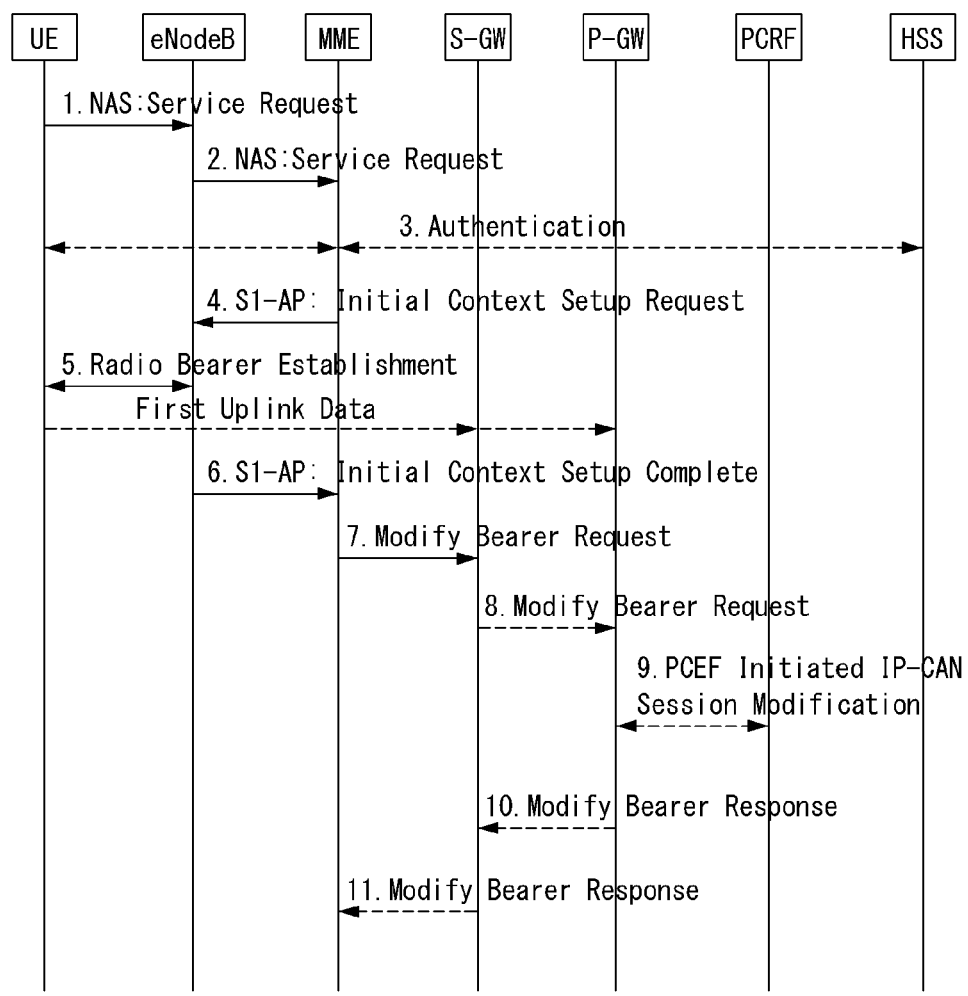
FIG. 12 is a diagram illustrating UE trigger service request procedure in the wireless communication system to which the present invention may be applied.

FIG. 12 illustrates UE trigger Service Request procedure in a wireless communication system to which the present invention may be applied 1-2. The UE initiates UE-triggered Service Request procedure by transmitting a Service Request message to the MME.

The Service Request message is delivered being included in an RRC connection setup complete message through the RRC connection and delivered being included in an initial UE message through the S1 signaling connection.

3. For authentication of the UE, the MME requests and receives information for the authentication from the HSS; and performs mutual authentication with the UE.

4. The MME transmits an Initial Context Setup Request message to the eNB so that the eNB may configure an S1 bearer with the S-GW and configure a DRB with the UE.

5. The eNB transmits an RRC Connection Reconfiguration message to the UE to create the DRB.

When this procedure is done, the creation of DRB is completed between the eNB and the UE, and all of uplink EPS bearers ranging from the UE to the P-GW are configured. The UE may transmit uplink traffic data to the P-GW.

6. The eNB transmits an Initial Context Setup Complete message including 'S1 eNB TEID' to the MME in response to the Initial Context Setup Request message.

7. The MME delivers the 'S1 eNB TEID' received from the eNB to the S-GW through a Modify Bearer Request message.

When this procedure is done, the creation of S1 bearer is completed between the eNB and the S-GW, and then all of the downlink EPS bearers ranging from the P-GW and the UE are configured. The UE may then receive downlink traffic data from the P-GW.

8. When a cell (E-UTRAN cell global Identifier; ECGI) where UE is located or tracking area (TAI) is changed, the S-GW informs that by transmitting a modify bearer request message to the P-GW.

9. If needed, the P-GW may perform an IP connectivity access network (IP-CAN) session modification procedure with the PCRF.

10. Receiving a Modify Bearer Request message from the S-GW, the P-GW transmits a Modify Bearer Response message to the S-GW in response to the message.

11. The S-GW transmits a Modify Bearer Response message to the MME in response to the Modify Bearer Request message.

A network-triggered Service Request procedure is usually performed when the network attempts to transmit downlink data to the UE staying in the ECM-IDLE state.

Figure 13:
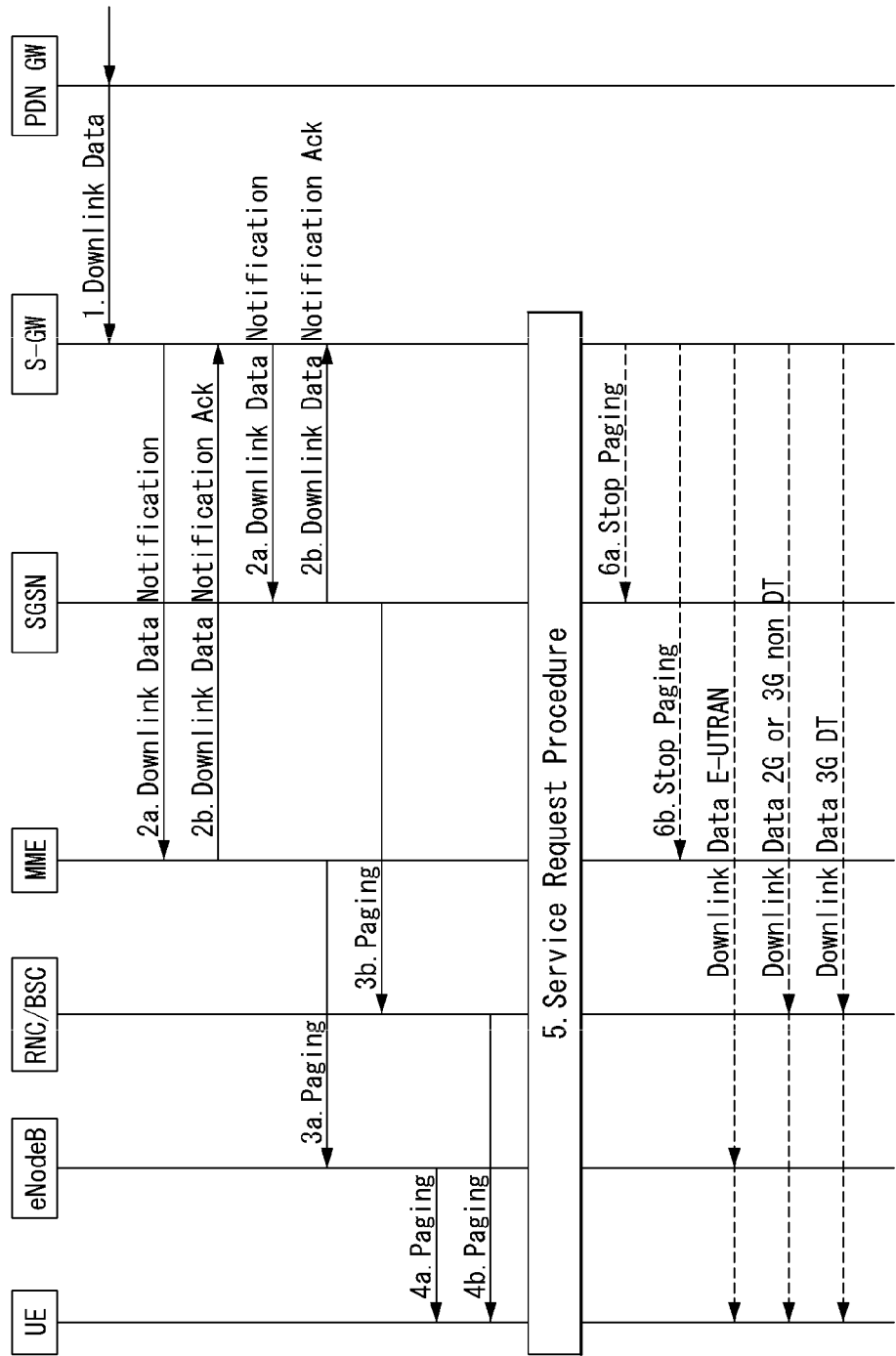
FIG. 13 is a diagram illustrating a network-triggered service request procedure in a wireless communication system to which the present invention may be applied.

FIG. 13 is a diagram illustrating a network-triggered service request procedure in a wireless communication system to which the present invention may be applied.

1. When downlink data arrives at the P-GW via an external network, the P-GW delivers downlink data to the S-GW.

2. If a downlink S1 bearer is unable to transmit downlink data to an eNB (i.e., 'S1 eNB TEID' value is not exist in the S-GW) since the downlink S1 bearer is released (i.e., ECM-IDLE state), the S-GW buffers the received downlink data. Furthermore, the S-GW transmits a downlink data notification message to an MME/SGSN where the eNB is registered for signaling connection and bearer configuration to the corresponding UE.

The MME/SGSN transmits a downlink data notification ACK message to the S-GW in response to the downlink data notification message.

3. The MME/SGSN transmits a paging message to all eNB/RNC (or base station controller; BSC) included in a tracking area where UE registered recently.

4. When the eNB/RNC (or BSC) receives the paging message from the MME/SGSN, the eNB/RNC (or BSC) broadcasts the paging message.

5. UE that notifies that there are downlink data toward itself setup ECM connection by performing a service request procedure. That is, in this case, the service request procedure is initiated by paging transmitted from network.

The Service Request procedure may be performed in the same way as the procedure of FIG. 12, and if the procedure is completed, the UE may receive downlink data from the S-GW.

6. When the paging response is received, the S-GW transmits "Stop Paging" message to the MME/SGSN.

When the MME/SGSN commands to transmit the paging transmission to the eNB/RNC (or BSC), the eNB/RNC (or BSC) calculates a paging occasion using an IMSI value and a DRX cycle of UE and transmits the paging message on the corresponding paging occasion. If there is no response from the UE for a specific duration in response to the paging transmission, the MME may regard it as paging transmission failure and command a Paging retransmission to the eNB/RNC (or BSC) or cells.

That is, the Paging retransmission is determined in case that the Service request of UE is not received at the MME, and the eNB does not monitor whether the paging is received or retransmitted. If the MME transmits the paging to a great many cells, since UE transmits a service request by being included in one of the cells, the eNB may determine that the corresponding UE is not existed in its cell.

Meanwhile, in case that the MME/SGSN is unable to receive a response from the UE even after the paging repetition/retransmission procedure, the MME/SGSN notifies Paging failure to the S-GW using a downlink data notification reject message.

When the downlink data notification Reject message is received, the S-GW may delete packet(s) which is buffered.

Paging

The paging procedure is used in order to transmit paging information to UE in RRC_IDLE mode in network, or to notify change of system information to UE in RRC_IDLE/RRC_CONNECTED mode, or to notify ETWS primary notification and/or ETWS secondary notification to all UEs in RRC_IDLE/RRC_CONNECTED mode, or to notify CMAS notification to UE in RRC_IDLE/RRC_CONNECTED mode.

Figure 14:
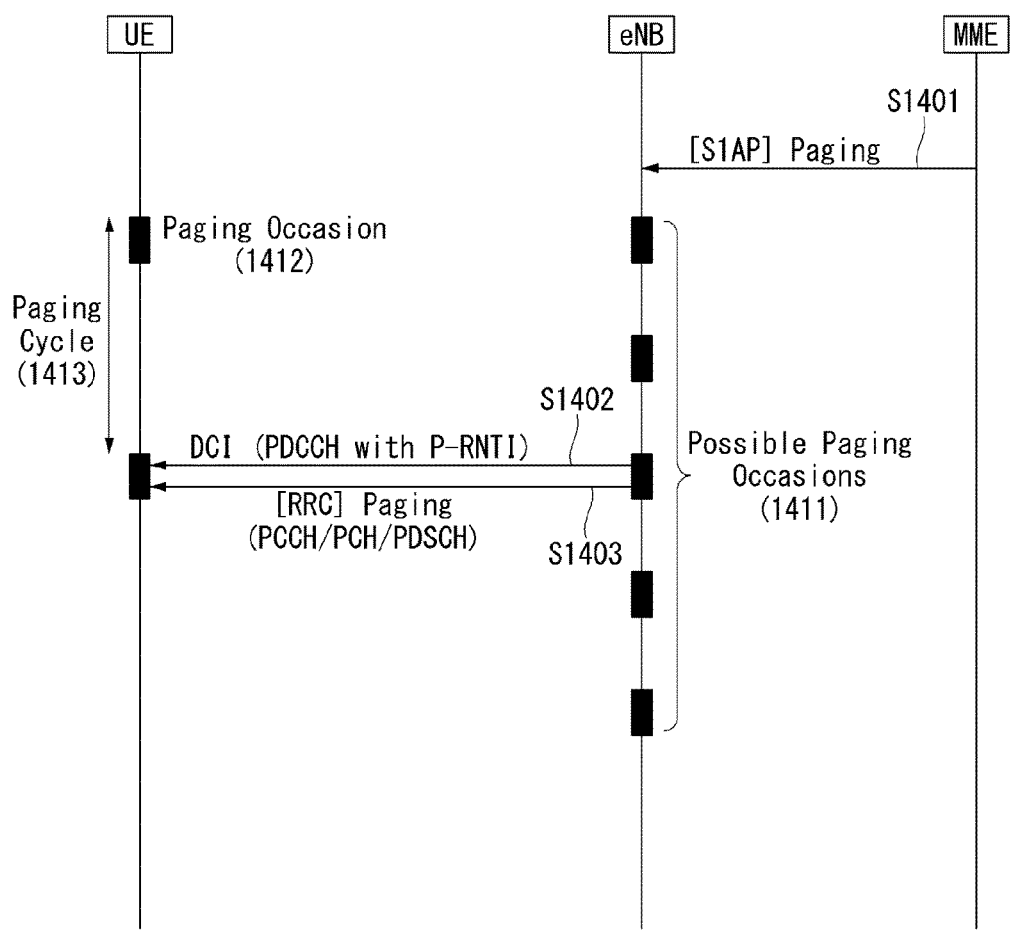
FIG. 14 is a diagram illustrating a paging procedure in a wireless communication system to which the present invention may be applied.

FIG. 14 is a diagram illustrating a paging procedure in a wireless communication system to which the present invention may be applied.

Referring to FIG. 14, an MME initiates a paging procedure by transmitting a S1AP paging message to an eNB (S1401).

As described above, locations of UE in ECM-IDLE state is managed in the MME based on Tracking Area (TA). Here, since the UE may be registered by one or more TAs, the MME may transmit a paging message to a plurality of eNBs that cover the cell belonged to the TA(s) where the UE is registered. Here, each cell may be belonged to only one TA, and each eNB may include cells belonged to different TAs.

Here, the MME transmits a paging message to each eNB through S1AP interface (or S1AP protocol). Hereinafter, this may be referred to 'S1AP paging message' (or paging request).

Table 2 illustrates the S1AP paging message.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |

Referring to Table 2, IE/Group Name represents a name of an information element (IE) or an IE group. 'M' in the Presence field is a mandatory IE, and represents an IE/IE group included in a message always. 'O' is an optional IE and represents an IE/IE group included or may not be included in a message. 'C' is a conditional IE and represents an IE/IE group included in a message only when a specific condition is satisfied. The Range field represents a number of which repeated IEs/IE groups is available to be repeated.

The IE type and reference field represents a type of the corresponding IE (e.g., ENUMERATED, INTEGER, OCTET STRING, etc.), and in case that a range of a value that the corresponding IE may have is present, represents the range of the value.

The Criticality field represents criticality information that is applied to an IE/IE group. The criticality information means information indicating how a reception terminal operates in case that the reception terminal does not understand all or a part of the IE/IE group. The sign, represents that the criticality information is not applied, and the sign 'YES' represents the criticality information is applied. 'GLOBAL' represents that an IE and repeated IE have one piece of common criticality information. 'EACH' represents that each of repeated IE has unique criticality information. Assigned Criticality field represents actual criticality information.

The information element (IE) or IE group included in the S1AP paging message will be described in more detail below.

Message type IE identifies a message which is transmitted.

UE Identity Index value IE is used for an eNB to calculate Paging Frame (PF) (e.g., UE Identity Index=UE IMSI mod 1024).

UE Paging Identity IE is an identity for identifying UE to be paged, and is indicated by one of SAE temporary mobile subscriber identity (S-TMSI). The S-TMSI means an identity that is available to uniquely identify UE among one MME group.

In case of normal paging, S-TMSI is used as UE paging identity. Meanwhile, in case of IMSI being used as UE paging identity, this is paging with IMSI. If the UE receives paging with the IMSI value, the UE performs a re-attach procedure.

If UE uses UE-specific DRX cycle length, Paging DRX IE is used to calculate paging frame (PF) at an eNB. The UE may specify the DRX cycle length in the attach request message or tracking area update (TAU) message.

CN Domain IE indicates whether the paging is generated in circuit switched (CS) domain or packet switched (PS) domain.

Tracking Area Identity (TAI) List IE is used to notify a TA in which a paging message should be broadcasted to an eNB. The TAI means an identity which is used to uniquely identify TA.

Closed Subscriber Group (CSG) ID List IE represents a CSG set where UE is subscribed. This prevents an eNB from paging to UE in a CSG cell where the UE is not subscribed.

Paging Priority IE indicates a paging priority for paging UE.

UE Radio Capability for Paging IE for paging includes paging-specific UE radio capability information.

The eNB that receives SLAP paging message from the MME configures a paging message (hereinafter, referred to an 'RRC paging message' (or paging information)).

Table 3 illustrates a RRC paging message.

TABLE 3

```
-- ASN1START
Paging ::=                          SEQUENCE {
    pagingRecordList                PagingRecordList        OPTIONAL,
    -- Need ON
    systemInfoModification              ENUMERATED {true}
    OPTIONAL,   -- Need ON
    etws-Indication                     ENUMERATED {true}
    OPTIONAL,   -- Need ON
    nonCriticalExtension                Paging-v890-IEs
    OPTIONAL    -- Need OP
}
Paging-v890-IEs ::=                 SEQUENCE {
    lateNonCriticalExtension        OCTET STRING
    OPTIONAL,   -- Need OP
    nonCriticalExtension            Paging-v920-IEs
    OPTIONAL    -- Need OP
}
Paging-v920-IEs ::=                 SEQUENCE {
    cmas-Indication-r9              ENUMERATED {true}
    OPTIONAL,   -- Need ON
    nonCriticalExtension            Paging-v1130-IEs        OPTIONAL
    -- Need OP
}
Paging-v1130-IEs ::=                SEQUENCE {
    eab-ParamModification-r11       ENUMERATED {true}
    OPTIONAL,   -- Need ON
    nonCriticalExtension            SEQUENCE { }
    OPTIONAL    -- Need OP
}
PagingRecordList ::=                SEQUENCE (SIZE (1..maxPageRec)) OF
PagingRecord
PagingRecord ::=                    SEQUENCE {
    ue-Identity                     PagingUE-Identity,
    cn-Domain                       ENUMERATED       {ps, cs},
    ...
}
PagingUE-Identity ::=               CHOICE {
    s-TMSI                          S-TMSI,
    imsi                            IMSI,
    ...
}
IMSI ::=                            SEQUENCE (SIZE (6..21)) OF IMSI-Digit
IMSI-Digit ::=                      INTEGER (0..9)
-- ASN1STOP
```

Referring to Table 3, a single RRC paging message of UE may carry information of multiple S1AP paging messages. That is, the RRC paging message may include multiple paging records (e.g., 16) for paging multiple UEs.

Each paging record includes a UE-Identity field and a CN domain field. This is a content which is transmitted from a S1AP paging message.

The systemInfoModification field is not delivered from the S1AP paging message, but is generated by an eNB. This field is used for triggering such that UE re-acquires a system information block (SIB) set.

The Extended Access Barring (EAB)-ParamModification field is used to indicate change of EAB parameter (SIB 14).

The ETWS-Indication field is not delivered from the S1AP paging message, but is generated by an eNB. This field is applied only to an ETWS capable UE, and is used to trigger such that the corresponding UE re-acquires SIB 1. The SIB 1 content indicates ETWS content in SIB 10 and SIB 11 to UE.

The CMAS-Indication field is applied only to a CMAS capable UE, and is used to trigger such that the corresponding UE re-acquires SIB 1. The SIB 1 content indicates CMAS content in SIB 12 to UE.

As such, the eNB that configures the RRC paging message transmits downlink control information (DCI) where cyclic redundancy check (CRC) which is scrambled to paging-RNTI (P-RNTI) to UE in the PDCCH (S1402), and transmits the RRC paging message to the UE through the PDSCH (S1403).

That is, an eNB delivers the RRC paging message through the PCCH logical channel, the PCH transport channel and the PDSCH physical channel to UE.

In more detail, the eNB determines a PDCCH format according to the DCI that will be sent to the UE, and attaches CRC to the DCI. According to the owner or use of the PDCCH, a unique radio network temporary identifier (RNTI) is scrambled (or masked) to CRC. For the PDCCH for a specific UE, a unique identity of UE (e.g., cell-RNTI; C-RNTI) may be masked to CRC. Or, for the PDCCH for a paging message, a paging indication identity (e.g., paging-RNTI; P-RNTI) may be masked to CRC.

That is, UE monitors the PDCCH based on P-RNTI in a subframe belonged to its paging occasion 1412. Furthermore, if the UE detects the PDCCH masked by P-RNTI, the UE decodes the DCI transmitted on the PDCCH. The DCI indicates the PDSCH resource where the paging message is transmitted. Furthermore, the UE decodes the RRC paging message from the PDSCH resource indicated in the DCI.

The paging cycle 1413 may be determined in a cell-specific manner, or determined in UE-specific manner. In addition, the paging occasion 1412 is determined based on its paging cycle 1413 and its identity (i.e., IMSI) for each piece of UE. Accordingly, the paging message is not transmitted to all UEs on an available paging occasion 1411 from an eNB, but the paging message is transmitted on the paging occasion 1412 of the corresponding UE. The paging occasion will be described in more detail later.

The paging procedure may be used for change of system information, reception of cell broadcast message (i.e., ETWS/CAMS warning message) and notification of EAB as well as notifying reception of an individual UE's Mobile Terminated (MT) call.

If a UE identity (e.g., IMSI or S-TMSI) is included (i.e., if the paging procedure is used for an MT call) in one of paging records included in the RRC paging message, the UE in RRC_IDLE mode initiates a random access procedure for establishing RRC connection (e.g., transmitting service request) with network.

Furthermore, if system information modification (systemInfoModification) is included in the RRC paging message, UE re-acquires the system information which is required by using a system information acquisition procedure.

In addition, if the ETWS indication (etws-Indication) is included in the RRC paging message and UE supports the ETWS, the UE re-acquires SIB 1 immediately. That is, the UE does not wait for the boundary of the next system information modification cycle. Furthermore, if the scheduling information list (schedulingInfoList) included in SIB 1 indicates that SIB 10 is present, the UE acquires SIB 10 based on the scheduling information (schedulingInfor). In addition, if the scheduling information list (schedulingInfoList) included in SIB 1 indicates that SIB 11 is present, the UE acquires SIB 11 based on the scheduling information (schedulingInfor).

Furthermore, CMAS indication (cmas-Indication) is included in the RRC paging message and UE supports CMAS, the UE re-acquires SIB 1 immediately. That is, the UE does not wait for the boundary of the next system information modification cycle. Furthermore, if the scheduling information list (schedulingInfoList) included in SIB 1 indicates that SIB 12 is present, the UE acquires SIB 12 based on the scheduling information (schedulingInfor).

As described above, if a cell broadcast message (i.e., ETWS/CAMS message) indication is included in the RRC paging message, UE receives SIB 10, SIB 11 and SIB 12 by referring to schedulingInfoList of SIB 1. The received SIB 10, SIB 11 and SIB 12 are delivered to a higher layer (e.g., RRC layer) of UE. In the higher layer of UE, the UE displays the message identifier included in the cell broadcast message which is delivered through SIB 10, SIB 11 and SIB 12 if the message identifier is included in a search list of the UE. Furthermore, otherwise, the UE discard it.

In addition, if UE in RRC_IDLE mode supports the EAB and the EAB parameter modification (eab-ParamModification) field is included in the RRC paging message, the UE regards SIB 14 which is stored before is not valid, and re-acquires SIB 1 immediately. That is, the UE does not wait for the boundary of the next system information modification cycle. Furthermore, the UE re-acquires SIB 14 using the system information acquisition procedure.

Hereinafter, a paging occasion will be described.

3GPP LTE/LTE-A system defines discontinuous reception (DRX) technique of UE in order to minimize the power consumption of UE.

UE that uses the DRX monitors whether a paging message is transmitted only one paging occasion for every Paging cycle (i.e., DRX cycle).

One Paging Frame (PF) means one radio frame that may include one or more paging occasion(s).

One paging occasion (PO) means one subframe where the P-RNTI transmitted on the PDCCH that addresses a paging message may be existed. That is, the paging occasion is defined as a specific subframe in a PF that UE checks a paging message.

The PF and the PO are determined by using IMSI and DRX values of UE. The UE may calculate the PF and the PO using its IMSI and DRX values. In addition, an eNB may also calculate the PF and the PO for each piece of UE through the IMSI value which is delivered from the MME.

The DRX parameter (i.e., paging/PCCH configuration information) may be transmitted with being included in a common radio resource configuration ('RadioResourceConfigCommon') IE which is a RRC message used for specifying common radio resource configurations. The common radio resource configuration IE may be transmitted through a RRC message, such as a RRC connection reconfiguration message or an S1 message. The S1 message is a message which is used for transmitting one or more SIBs.

In addition, UE may also request its DRX cycle through an attach request or a tracking area update (TAU) request message. Here, a DRX cycle length set that the UE may request is identical to the length set which is used in the system information.

Table 4 illustrates the PCCH configuration information in the common radio resource configuration IE.

TABLE 4

PCCH-Config::=  SEQUENCE {
    defaultPagingCycle  ENUMERATED {
        rf32, rf64, rf128, rf256}, TABLE 4-continued

| nB | ENUMERATED { |
|---|---|
| | fourT, twoT, oneT, halfT, quarterT, oneEighthT, oneSixteenthT, oneThirtySecondT} |
}

Referring to Table 4, the PCCH configuration information includes the 'defaultPagingCycle' field that indicates a default paging cycle length and the parameter 'nB' for acquiring the paging frame and the paging occasion.

The 'defaultPagingCycle' field has a default paging cycle length, and setup as one value of {rf32, rf64, rf128, rf256}. The if means radio frame, and the numbers behind the 'rf' means the number of radio frames. For example, if 'defaultPagingCycle'=rf32, the paging default cycle includes 32 radio frames, and if 'defaultPagingCycle'=rf64, the paging default cycle includes 64 radio frames.

The value of 'nB' parameter is indicated by a multiple of 'T' (4T, 2T, T, T/2, T/4, T/8, T/16 or T/32). For example, if 'nB'=fourT, the parameter value of 'nB' is 4*T, and if 'nB'=quarterT, the parameter value of 'nB' is T/4.

Here, 'T' represents a DRX cycle of UE. 'T' is determined to the smallest value among UE-specific DRX cycle and the basic DRX cycle ('defaultPagingCycle' field value) which is broadcasted in the system information. If the UE-specific DRX cycle is not setup by a higher layer, 'T' is determined to the default DRX cycle.

The PF is determined according to Equation 1 below.

$$SFN \bmod T = (T \text{ div } N)*(UE\_ID \bmod N) \quad (1)$$

In Equation 1, N represents min(T, nB), and UE_ID represents (IMSI mod 1024).

UE does not monitor all subframes of the PF which is determined as above, but monitors only the subframe which is distinguished by the PO determined by Equation 2 below and Table 5 (or Table 6).

$$i\_s = \text{floor}(UE\_ID/N) \bmod Ns \quad (2)$$

In Equation 2, Ns represents max(1, nB/T).

Table 5 illustrates a subframe pattern for determining the PO in FDD.

TABLE 5

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

Table 6 illustrates a subframe pattern for determining the PO in TDD.

TABLE 6

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

By applying i_s value determined by Equation 2 above to Table 5 and Table 6, the subframe index that corresponds to the PO is determined. That is, UE monitors only the subframe that corresponds to the PO in the PF which is determined.

Periodic TAU Procedure

The Tracking Area Update (TAU) procedure is performed when the UE staying in the ECM-IDLE state attempts registering a new position or the TAU timer expires.

Figure 15:
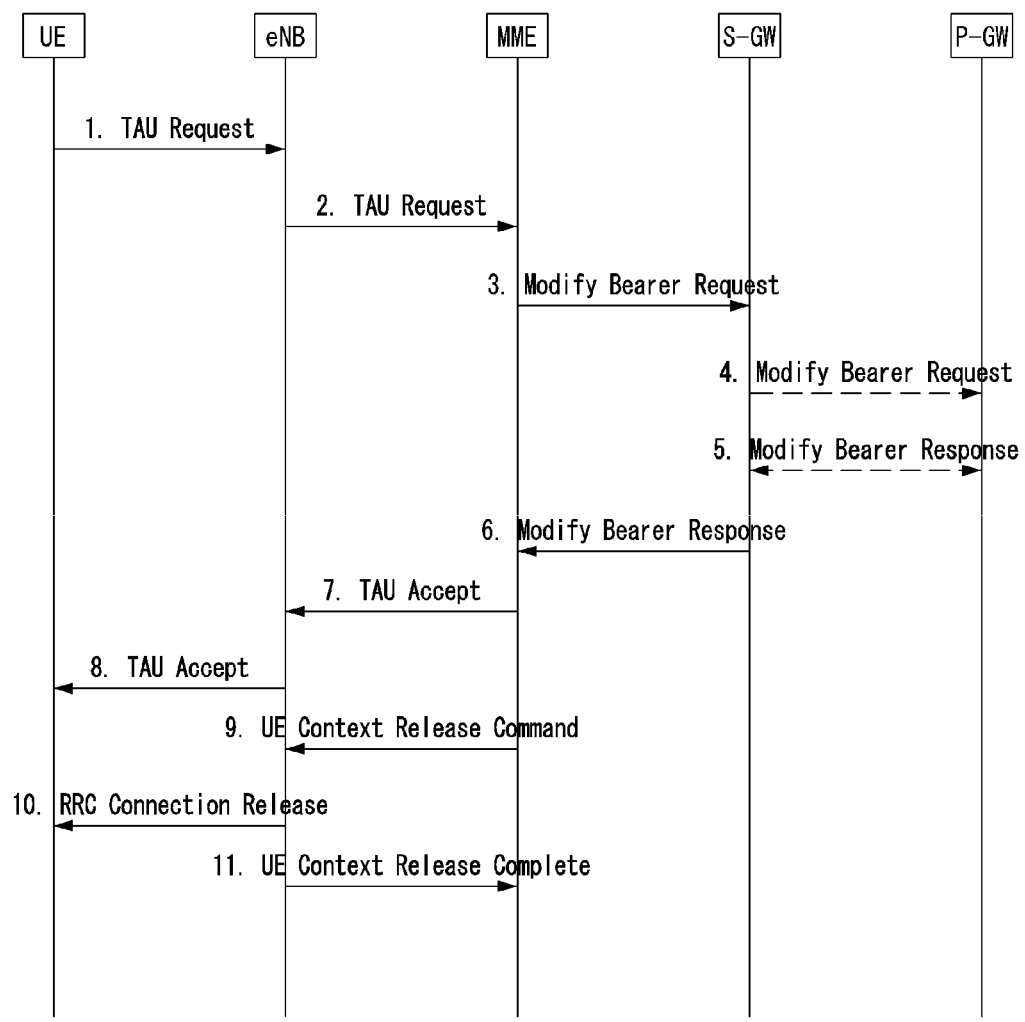
FIG. 15 illustrates a periodic tracking area update procedure in a wireless communication system to which the present invention may be applied.

FIG. 15 illustrates a periodic tracking area update procedure in a wireless communication system to which the present invention may be applied.

1-2. If the TAU timer of the UE in the ECM-IDLE state expires, the Periodic TAU (P-TAU) procedure for reporting a Tracking Area (TA) to the MME is triggered.

The UE initiates the P-TAU procedure by transmitting a TAU Request message to the MME.

The TAU Request message is delivered being included in an RRC connection setup complete message through the RRC connection and is delivered being included in the initial UE message through the S1 signaling connection.

3. The MME which receives the TAU Request message resets the TAU timer and transmits a Modify Bearer Request message including an E-UTRAN Cell Global Identifier (ECGI) and a TAI to the S-GW.

4-5. If the cell (ECGI) or the tracking area (TAI) in which the UE is located changes, the S-GW transmits the Modify Bearer Request message to the P-GW.

The P-GW performs an EPS session update procedure and transmits a Modify Bearer Response message to the S-GW in response to the Modify Bearer Request message.

6. The S-GW transmits a Modify Bearer Response message to the MME in response to the Modify Bearer Request message.

7-8. The MME transmits a TAU Accept message to the UE in response to a TAU Request message.

The TAU Accept message may include the TAU timer.

The TAU Accept message is delivered being included in a downlink NAS transport message through the S1 signaling connection and delivered being included in a downlink information transfer message through the RRC connection.

9. The MME which has completed a position update of the UE releases connection to the UE used for transmission and reception of the periodic TAU-related message and transmits UE context release command to the eNB to release the user context set up within the E-UTRAN.

10. The eNB deletes the context of the UE and releases resources allocated to the UE. Furthermore, the eNB releases RRC connection to the UE by transmitting an RRC connection release message to the UE.

11. The eNB transmits UE context release complete message to the MME in response to UE context release command message, thereby releasing the S1 signaling connection between the eNB and the MME.

When the procedure above is completed, the UE again makes a transition to the ECM-IDLE state.

Discontinuous Reception (DRX) Mode

The 3GPP LTE/LTE-A system defines EPS Connection Management (ECM)-CONNECTED state and ECM-IDLE state to manage signaling connection between the UE and the network. The ECM-CONNECTED state and ECM-IDLE state may also be applied to the UE and the MME. ECM connection comprises RRC connection established between the UE and the eNB; and S1 signaling connection established between the eNB and the MME. RRC state shows whether the RRC layer of the UE is logically connected to the RRC layer of the eNB. In other words, if RRC layer of the UE and the RRC layer of the eNB are connected to each other, the UE stays in the RRC_CONNECTED state. Meanwhile, if the RRC layer of the UE is not connected to the RRC layer of the eNB, the UE stays in the RRC_IDLE state.

In this case, the RRC_CONNECTED state refers to the state where the UE is connected to a particular cell and indicates that the UE may receive a service in the cell unit, where the UE is managed in units of cells.

RRC_IDLE state refers to the state where no connection is established between the UE and the eNB, but only the connection to a Mobility Management Entity (MME) is maintained; in the RRC_IDLE state, the UE is managed in the Tracking Area (TA) unit which is an area unit larger than a cell. In other words, the UE in the RRC_IDLE state wakes up intermittently and monitors the Paging Channel (PCH) to check whether there is a paging message being transmitted to the UE. In other words, the UE performs Discontinuous Reception (DRX) set up by the Non-Access Stratum (NAS) by using the ID allocated uniquely in the tracking area. The UE may receive a broadcast signal of the system information and paging information by monitoring a paging signal for a specific paging event at each piece of UE-specific paging DRX cycle. Furthermore, the UE confirms whether mobile terminated calls are arrived and the UE enters the RRC_CONNECTED state through the service request procedure in case of being included the UE's ID in the paging channel. The UE which does not receive any activated service through the aforementioned network state definitions eventually minimizes its power consumption, and thus the eNB may utilize resources in an efficient manner.

As described above, to receive general mobile communication services, such as voice and data communication, the UE has to make a transition to the ECM-CONNECTED state. As in the case when the UE is first powered on, the initial UE stays in the ECM-IDLE state; if the UE successfully registers to the corresponding network through an initial attach procedure, the UE and the MME makes a transition to the ECM-CONNECTED state. Furthermore, if UE has been registered to the network but radio resources are not allocated to the UE as traffic is not activated, the UE stays in the ECM-IDLE state; if uplink or downlink traffic is newly generated in the corresponding UE, the UE and the MME make a transition to the ECM-CONNECTED state through a Service Request procedure.

The 3GPP LTE/LTE-A system defines a dormant mode and an active mode even for the RRC_CONNECTED state to minimize power consumption of the UE.

According to the definition above, if the UE staying in the RRC_CONNECTED state does not transmit or receive data for a predetermined time period, cell connection is retained, but the UE is made to enter the dormant mode. The UE staying in the dormant mode has to occasionally wake up and monitor a physical control channel to receive data that may be transmitted to the UE.

As described above, a wireless communication system employs a Discontinuous Reception (DRX) scheme of the UE to minimize power consumption of the UE.

The DRX method defined in the 3GPP LTE/LTE-A system may be used both for the dormant mode and the RRC_IDLE mode, and the DRX methods used in the respective modes are as follows.

1) Dormant Mode in the RRC_CONNECTED State
Short DRX: short DRX cycle (2 ms~640 ms)
Long DRX: long DRX cycle (10 ms~2560 ms)
2) RRC_IDLE State
Paging DRX: paging DRX cycle (320 ms~2560 ms)

The UE may perform monitoring of the PDCCH based on its unique identifier, RNTI (e.g., C-RNTI, SI-RNTI, P-RNTI, and so on).

Monitoring of the PDCCH may be controlled by the DRX operation, and the eNB transmits the parameters related to the DRX to the UE through the RRC message. In particular, the UE has to always receive the SI-RNTI, P-RNTI, and so on irrespective of the DRX operation composed by the RRC message. In this case, the other PDCCHs excluding the PDCCH scrambled with the C-RNTI are always received through the common search space of a main serving cell (e.g., Pcell).

If the DRX parameters are set up while the UE is in the RRC_CONNECTED state, the UE performs discontinuous monitoring of the PDCCH based on the DRX operation. Meanwhile, if the DRX parameters are not set up, the UE performs continuous monitoring of the PDCCH.

In other words, the UE searches the PDCCH by performing blind decoding in UE-specific search space of the PDCCH region based on the DRX operation. If no CRC error is detected when the UE unmasks the CRC of the PDCCH by using the RNTI, the UE regards that the corresponding PDCCH delivers the UE's control information.

Discontinuous PDCCH monitoring indicates that the UE monitors the PDCCH only in specific subframes, while continuous PDCCH monitoring indicates that the UE monitors the PDCCH for all of the subframes. Meanwhile, in case PDCCH monitoring is required in the operation unrelated to the DRX, such as the random access procedure, the UE monitors the PDCCH according to the requirements of the corresponding operation.

Furthermore, the UE receiving a paging message as described above may perform DRX to reduce power consumption.

To this purpose, the network configures a plurality of paging occasions for each time period called a paging cycle, a specific UE receives paging messages only at the time of specific paging occasions, and the UE does not receive a paging channel except for the specific paging occasions. Furthermore, one paging occasion corresponds to one TTI.

Extended DRX (eDRX) is a function for extending a maximum of an existing paging DRX cycle of 2.56 s to a maximum of several minutes to several tens of minutes in order to minimize power consumption of UE. eDRX may be applied to idle mode and connected mode. The paging DRX cycle of the eDRX applied to the connected mode may be 10.24 s and be relatively shorter than that of the eDRX applied to the idle mode.

In the case of UE supporting eDRX mode, the state in which the UE is unreachable may mean the state in which the UE is unreachable by paging (i.e., a DRX interval in which the UE does not monitor a paging channel).

In contrast, in the case of UE supporting eDRX mode, the state in which the UE is reachable may mean the state in which the UE is immediately reachable in ECM-CONNECTED mode and/or by paging (i.e., the interval in which the UE monitors a paging channel).

In other words, in eDRX mode, UE may be determined to be temporarily unreachable even in an idle interval because a DRX interval is relatively longer than that in DRX mode. That is, if common DRX (2.56 seconds) is supported, data delivery is possible after a maximum of 2.56 seconds. If eDRX (e.g., 10 minutes) is applied, however, immediate data delivery is impossible because maximum latency is 10 minutes, which may be considered to be substantially unreachable.

UE and a network may negotiate with each other the use of extended idle mode DRX through NAS signaling in order to reduce power consumption of the UE. UE using extended idle mode DRX may use UE-terminating data (or mobile terminating data) and/or a network-originated procedure within specific latency time depending on a DRX cycle value.

UE (in particular, a UE-side application) that wants to use extended idle mode DRX needs to specially control a UE-terminating service or data delivery. In particular, corresponding UE needs to take into consideration delay tolerance of UE-terminating data. A network (in particular, a network-side application) needs to send UE-terminating data, SMS, or device trigger and to be aware of whether extended idle mode DRX has been prepared. UE needs to request extended idle mode DRX only when all of types of expected UE-terminating communication has latency tolerance.

In order to negotiate the use of extended idle mode DRX, UE requests an extended idle mode DRX parameter during an attach procedure and RAU/TAU procedure. The SGSN/MME may reject or accept the request of the UE for extended idle mode DRX. If the SGSN/MME accepts extended idle mode DRX, the SGSN/MME may provide a value different from the extended idle mode DRX parameter, requested by the UE, based on an operator policy. If the SGSN/MME accepts the use of extended idle mode DRX, the UE applies extended idle mode DRX based on the received extended idle mode DRX parameter. If the SGSN/MME rejects the request or if the UE does not receive the extended idle mode DRX parameter within a related accept message for a reason, such as that the request is received by an SGSN/MME not supporting extended idle mode DRX, the UE applies existing DRX.

If UE requests both Power Saving Mode (PSM) (a request for an active time and/or a Periodic TAU (P-TAU) timer) and extended idle mode DRX through NAS, the SGSN/MME may be determined as follows.

Activate only PSM (i.e., the rejection of a request for extended idle mode DRX)

Activate only extended idle mode DRX (i.e., the rejection of a request for an active time)

Activate both PSM (i.e., provide an active time) and extended idle mode DRX (i.e., provide an extended idle mode DRX parameter)

If one of the three types is determined and a related parameter (i.e., an active time, a P-TAU timer and/or an extended idle mode DRX cycle value) is provided to the UE, the following attach or RAU/TAU procedure is initiated and used until one of the three types is newly determined. If both extended idle mode DRX and PSM are activated, an extended idle mode DRX cycle may be set to have a plurality of paging occasions while an active timer is driven.

If a PSM active time provided by UE is greater than an extended idle mode DRX cycle, the SGSN/MME may activate both PSM and extended idle mode DRX. This can minimize power consumption while the UE is in an active time.

Power Saving Mode

Power Saving Mode (PSM) is one of the 3GPP MTCe (Enhancement for MTC) features, where UE may minimize power consumption by defining an interval in which the UE deactivates all of the Access Stratum (AS) operations, such as paging reception and mobility management. In other words, UE supporting the PSM may compromise with the network on the Active Time and periodic TAU timer or receive the Active Time and periodic TAU timer from the network during attach and tracking area update.

If the UE receives the Active Time value from the network, when the UE transits from the ECM-CONNECTED to the ECM-IDLE state, the UE receives a paging message by staying in the ECM-IDLE state during the corresponding Active Time period. Furthermore, if the Active Time period the UE enters the PSM and deactivates all Access Stratum (AS) operations.

Furthermore, the MME initiates the Active timer by applying the Active Time value each time the UE enters ECM-IDLE mode. Furthermore, if the Active timer expires, the MME deduces that the UE is unreachable.

In other words, Active Time refers to the time period during which the UE supporting the state employing a power saving function (e.g., PSM) stays in the ECM-IDLE (or RRC_IDLE) state.

If the periodic TAU timer expires, the UE again enables the AS operation and performs the TAU, and the network stops the implicit detach timer of the corresponding UE. The UE may wake up anytime for a mobile-originated call (e.g., uplink data packet transfer).

Meanwhile, the UE wakes up at each P-TAU period and performs TAU to deal with mobile terminated calls (e.g., downlink data packet receiving), performs the paging receiving operation during the received Active Time, and again enters the PSM mode to sleep.

MTC (Machine-Type Communication)

Figure 16:
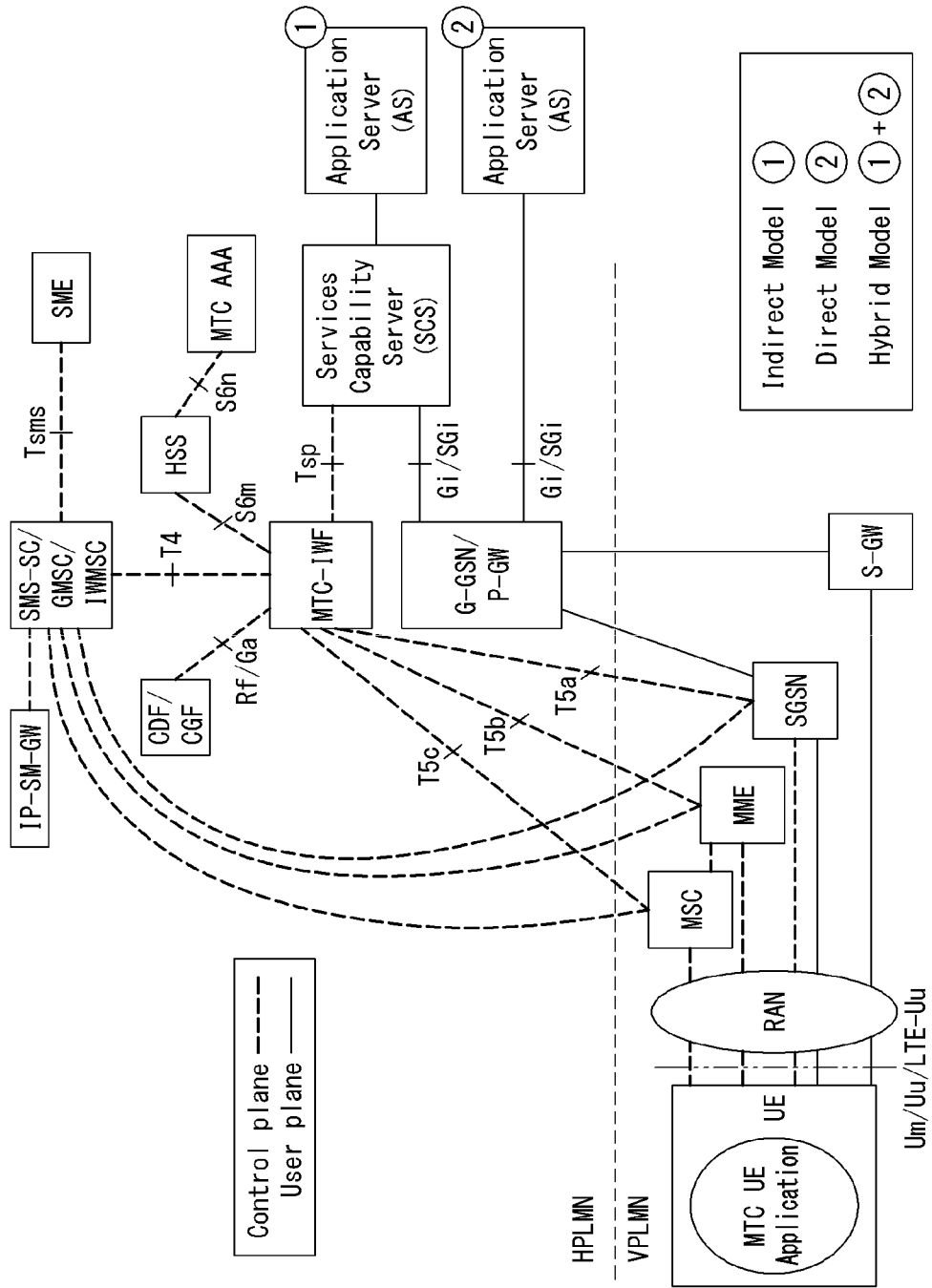
FIG. 16 is a diagram illustrating Machine-Type Communication (MTC) architecture in a wireless communication system to which the present invention may be applied.

FIG. 16 is a diagram illustrating Machine-Type Communication (MTC) architecture in a wireless communication system to which the present invention may be applied.

An end-to-end application between UE (or MTC UE) and an MTC application used for MTC may use services provided by a 3GPP system and optional services provided to an MTC server. A 3GPP system may provide transport and communication services (including 3GPP bearer services, IMS, and SMS) including various optimizations which facilitate MTC.

FIG. 16 shows an example in which UE used for MTC is connected to 3GPP networks (e.g., an UTRAN, an E-UTRAN, a GERAN, and an I-WLAN) through Um/Uu/LTE-Uu interfaces. The architecture of FIG. 16 includes various MTC models (e.g., a direct model, indirect model, and hybrid model).

First, entities shown in FIG. 16 are described.

In FIG. 16, an MTC application server is a server on a network in which an MTC application is executed. The aforementioned technologies for implementing various MTC applications may be applied to the MTC application server, and a detailed description thereof is omitted. Furthermore, in FIG. 16, the MTC application server may access an MTC server through a reference point API, and a detailed description thereof is omitted. In some embodiments, the MTC application server and the MTC server may be collocated.

The MTC server (e.g., an SCS server of FIG. 16) is a server on a network managing MTC UE. The MTC server may be connected to a 3GPP network and may communicate with UE and PLMN nodes used for MTC.

A MTC-interworking Function (MTC-IWF) manages interworking between the MTC server and an operator core network and may function as the proxy of an MTC operation. In order to support the MTC indirect or hybrid model, the MTC-IWF may relay or interpret signaling protocols on a reference point Tsp and drive a specific function in a PLMN. The MTC-IWF may perform a function for authenticating the MTC server, a function for authenticating a control plane request from the MTC server, and various functions related to a trigger indication before the MTC server sets up communication with a 3GPP network.

A Short Message Service-Service Center (SMS-SC)/Internet Protocol Short Message gateway (IP-SM-GW) may manage the transmission and reception of SMS messages. The SMS-SC may be responsible for a function for relaying, storing, and delivering SMS messages between a Short Message Entity (SME) (an entity for sending or receiving SMS messages) and UE. The IP-SM-GW may be responsible for protocol interworking between IP-based UE and the SMS-SC.

A Charging Data Function (CDF)/Charging Gateway Function (CGF) may perform operations related to billing.

An HLR/HSS may function to store subscriber information (e.g., an IMSI), routing information, and configuration information and provide them to the MTC-IWF.

An MSC/SGSN/MME may perform control functions, such as mobility management for the network connection of UE, authentication, and resource assignment. In relation to triggering to be described later, the MSC/SGSN/MME may function to receive a trigger indication from the MTC-IWF and to process the received trigger indication in the form of a message provided to MTC UE.

A Gateway GPRS Support Node (GGSN)/Serving-Gateway (S-GW)+Packet Date Network-Gateway (P-GW) may perform a gateway function that is responsible for connection between a core network and an external network.

Table 7 summarizes major reference points in FIG. 16.

TABLE 7

| Reference point | Description |
| --- | --- |
| Tsms | A reference point used by an entity outside a 3GPP system in order to communicate with MTC UE through SMS |
| Tsp | A reference point used by an entity outside a 3GPP system in order to communicate with the MTC-IWF in relation to control plane signaling |
| T4 | A reference point used by the MTC-IWF in order to route a device trigger to the SMS-SC of an HPLMN |
| T5a | A reference point between the MTC-IWF and a serving SGSN |
| T5b | A reference point between the MTC-IWF and a serving MME |
| T5c | A reference point between the MTC-IWF and a serving MSC |
| S6m | A reference point used by the MTC-IWF in order to query about ID information (E.164 Mobile Station International Subscriber Directory Number (MSISDN) of UE or an IMSI mapped to an external ID) and to collect UE reachability and configuration information |

In Table 7, one or more of the T5a, T5b, and T5c reference points are called T5.

Meanwhile, user plane communication with the MTC server in the indirect and hybrid models and communication with the MTC application server in the direct and hybrid models may be performed using an existing protocol through reference points Gi and SGi.

The detailed description related to the contents described with reference to FIG. 16 may be incorporated into this document by reference with reference to 3GPP TS 23.682 document.

Figure 17:
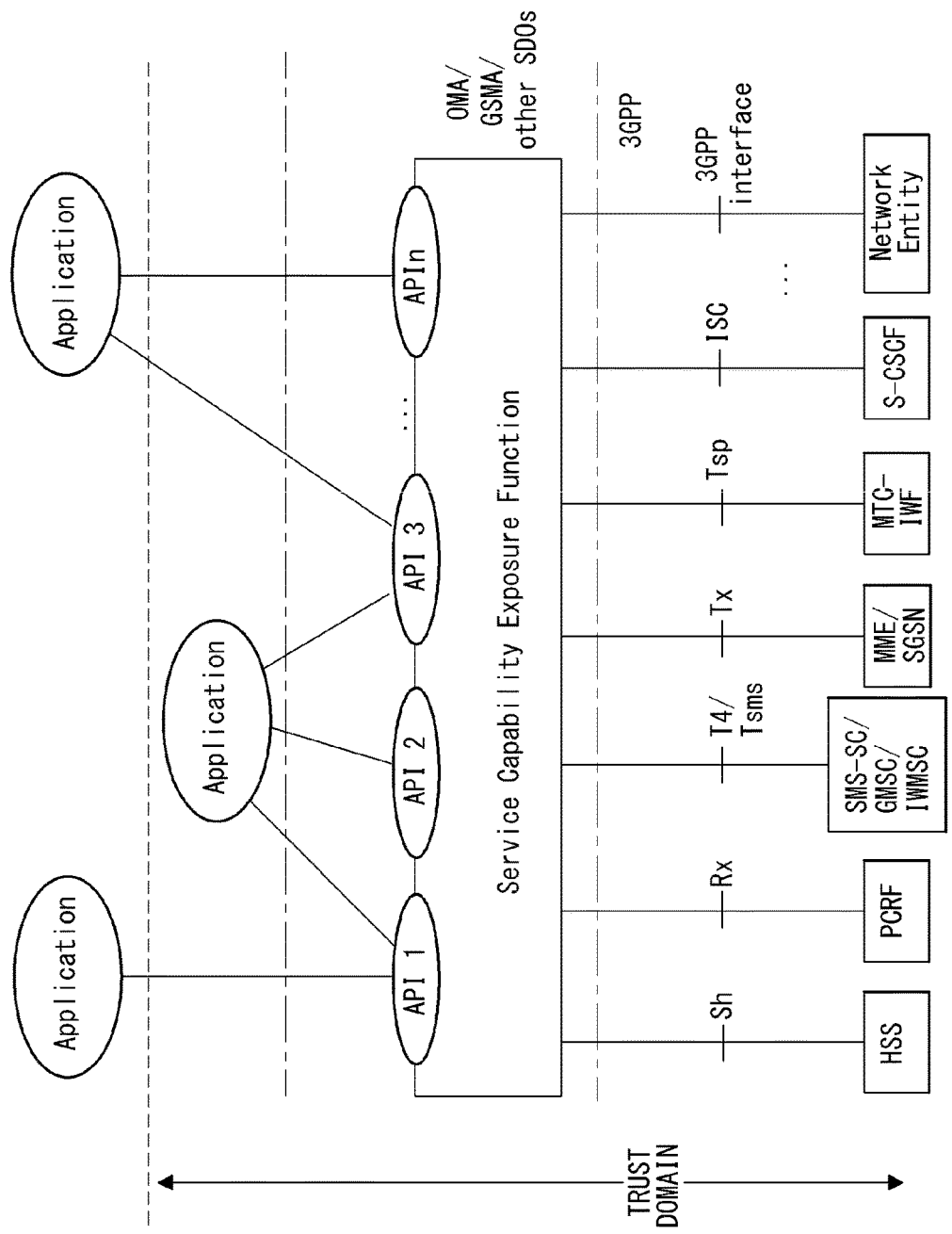
FIG. 17 illustrates architecture for service capability exposure in a wireless communication system to which the present invention may be applied.

FIG. 17 illustrates architecture for service capability exposure in a wireless communication system to which the present invention may be applied.

The architecture for service capability exposure illustrated in FIG. 17 enables a 3GPP network to safely expose its own services and capabilities, provided by a 3GPP network interface, to an external 3rd party service provider application.

A Service Capability Exposure Function (SCEF) is a core entity within 3GPP architecture for service capability exposure which provides means for safely exposing services and capabilities provided by a 3GPP network interface. In other words, the SCEF is a core entity for providing a service function belonging to a trusted domain operated by a mobile communication operator. The SCEF provides an API interface to a 3rd party service provider and provides service functions of 3GPP to a 3rd party service provider through connection with various entities of 3GPP. The SCEF may be provided by an SCS.

If the Tsp function is able to be exposed through an Application Program Interface (API), the MTC-IWF and the SCEF may be co-located. A protocol (e.g., DIAMETER, RESTful APIs, or XML over HTTP) for specifying a new 3GPP interface based on multiple factors is selected. In this case, the multiple factors require the ease of exposure of requested information or a specific interface, but are not limited thereto.

Monitoring enhancements (MONTE) means an item for providing a convenience function in which a 3rd party MTC operator can remotely monitor its own MTC UE. That is, when the 3rd party service provider registers a required monitoring event with the SCEF through the application server, the SCEF may report whether an event has occurred to the AS when the corresponding event is generated.

In 3GPP, the following monitoring events for MTC monitoring are defined.
1) The roaming status and serving network of UE
2) The location of UE
3) A change in the association of an MTC Device and a Universal IC Card (UICC)
4) A loss of connectivity
5) UE reachability
6) Communication failure
7) Reporting the number of pieces of UE present in a certain area Furthermore, a Release-13 (Rel-13) HLcom (Study on Optimizations to Support High Latency) item is in study in order to solve a DL data transmission failure and unnecessary retransmission in the Services Capability Server/Application Server (SCS/AS) generated because UE to which a power saving function (e.g., PSM, extended DRX (eDRX) is applied is unreachable.

In particular, a solution for solving the problems in the HLcom item using the UE reachability monitoring of the aforementioned monitoring solutions is a reusing MONTE solution. This is described below with reference to FIG. 18.

Figure 18:
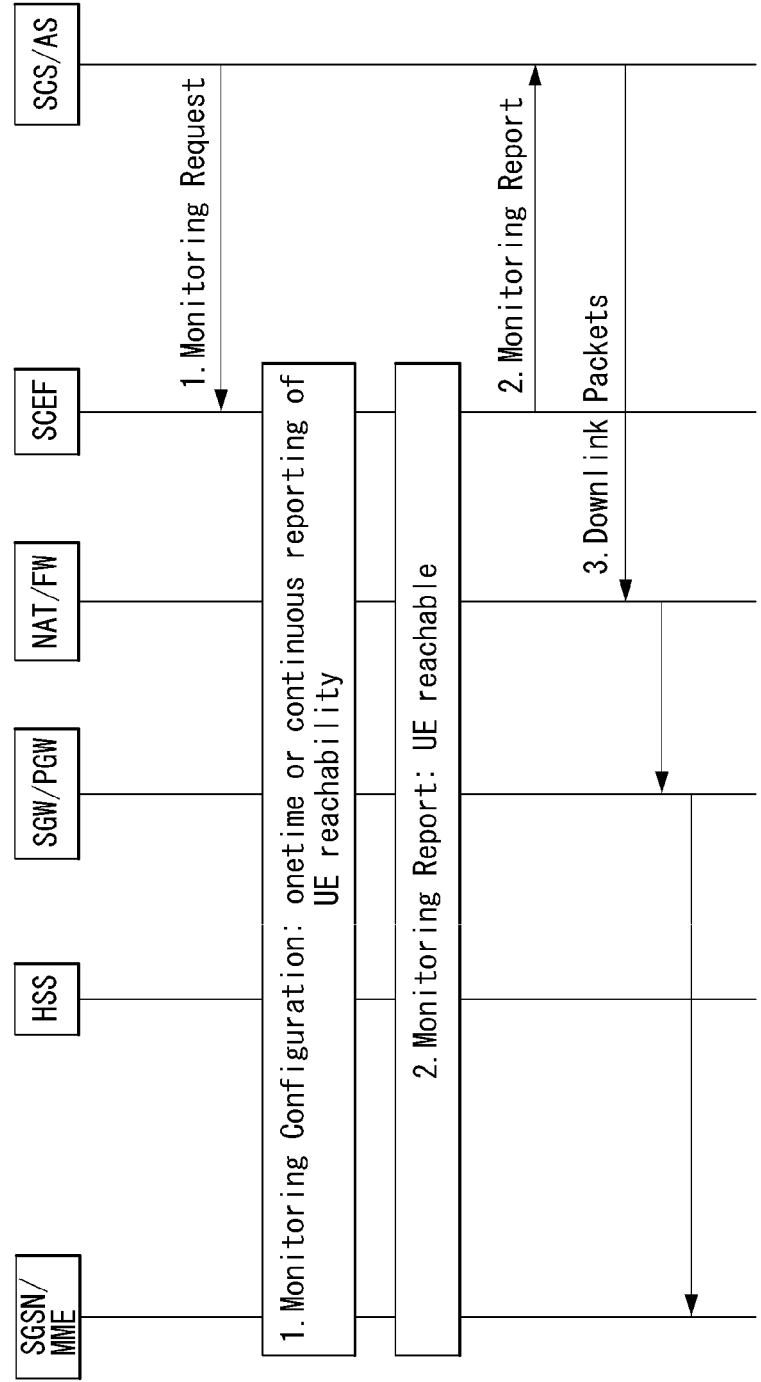
FIG. 18 is a diagram illustrating a method for transmitting data through reporting method of monitoring event-based UE reachability in a wireless communication system to which the present invention may be applied.

FIG. 18 is a diagram illustrating a method for transmitting data through reporting method of monitoring event-based UE reachability in a wireless communication system to which the present invention may be applied.

This solution is a solution for UE using other characteristics (e.g., eDRX) which cause high latency for PSM or downlink data. In order to notify the SCS/AS of UE reachability, monitoring for MONTE is reused. If the SCS/AS wants to send downlink data to sleeping UE (e.g., UE using PSM, eDRX), the SCS/AS registers a 'UE reachability' monitoring event through the SCEF interface/API in order to detect delivery availability.

Furthermore, the SCS/AS sends mobile-terminated data only when UE is reachable (i.e., when the SCS/AS receives a 'UE reachability' notification).

1. The SCS/AS sends a monitoring request message to the SCEF in order to configure UE reachability event reporting.

The SCEF configures the monitoring of UE reachability. The SCEF configures the corresponding monitoring event on appropriate EPS nodes (e.g., MME) via HSS.

2. When the UE becomes reachable, for example, when PSM UE is connected to a network (e.g., periodic TAU) or is attached, the monitoring event is reported to the SCEF, and the SCEF delivers the monitoring event to the SCS/AS.

3. The SCS/AS sends a downlink packet to the UE.

UE Reachability Monitoring Method for UE Adopting Extended DRX

Terms which may be used in this document are defined as follows.

MTC UE (or an MTC device or MTC apparatus): UE performing an MTC function using a communication (e.g., communication with an MTC server through a PLMN) function over a mobile communication network An MTC user: An MTC user uses services provided by an MTC server.

A Services Capability Server (SCS): this is an entity for communicating with an MTC interworking Function (MTC-IWF) and MTC UE on a Home PLMN (HPLMN) and is connected to a 3GPP network. The SCS provides capabilities for use by one or more MTC application.

A Service Capability Exposure Function (SCEF): this is an entity within 3GPP architecture for service capability exposure which provides means for safely exposing services and capabilities provided by a 3GPP network interface.

The solution illustrated in FIG. 18 reuses a monitoring method through the MME/SGSN and HSS. The monitoring method through the MME/SGSN and HSS is a method designed for UE to which PSM is applied, but UE to which eDRX is applied is not taken into consideration.

That is, in order for the solution of FIG. 18 to be used in UE to which eDRX is applied, it is necessary to add a function that enables eDRX to be applied even in UE reachability event monitoring to the solution.

Accordingly, an embodiment of the present invention proposes a method for performing or supporting UE reachability event monitoring if eDRX is applied to UE.

Embodiment 1

If UE supports a power saving function (e.g., PSM or eDRX) as at step 1 of FIG. 18, the SCS/AS configures a 'UE reachability' monitoring event in the MME/SGSN through the SCEF and HSS if it has data to be transmitted to the UE.

Figure 19:
FIG. 19 is a diagram illustrating a UE reachability notification request procedure in a wireless communication system to which the present invention may be applied.

In this case, the MME/SGSN performs a UE reachability notification request procedure on the corresponding UE as shown in FIG. 19. This is described in more detail below with reference to FIG. 19.

FIG. 19 is a diagram illustrating a UE reachability notification request procedure in a wireless communication system to which the present invention may be applied.

The UE reachability notification request procedure is a procedure in which the Application Server (AS)/SCS end requests a UE reachability notification from the HSS. This is described in detail below.

When a service-related entity (i.e., the AS/SCS) requests the HSS to provide an indication related to UE reachability in the EPS, the HSS stores the service-related entity and sets a UE Reachability Request Parameter for MME (URRP-MME) in order to indicate that such a request has been received.

In this case, the URRP-MME is one of data maintained in the HSS and is a UE reachability request parameter indicating whether a UE activity notification from the MME has been requested by the HSS.

If the value of the URRP-MME is changed from "not set" to "set", the HSS requests the MME to set the URRP-MME parameter for corresponding UE by sending a UE reachability notification request (UE-REACHABILITY-NOTIFI-CATION-REQUEST) message to the MME. In this case, the UE reachability notification request message includes the URRP-MME parameter.

If the MME has Mobility Management (MM) context for a user, when the MME detects a change of UE reachability (e.g., when a next NAS operation of UE is detected), it sets an URRP-MME for indicating that information related to the change of UE reachability needs to be reported to the HSS.

In this case, the URRP-MME is one of pieces of MM context maintained within the MME and indicates that the HSS has requested the MME to report information related to UE reachability to the HSS.

Figure 20:
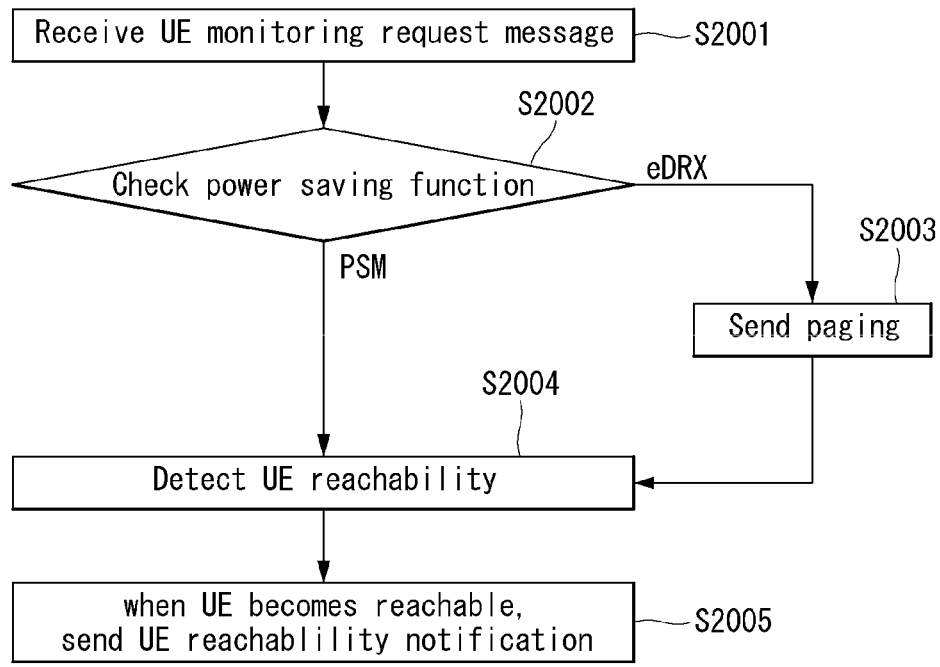
FIG. 20 is a diagram illustrating a method for monitoring UE reachability according to an embodiment of the present invention.

FIG. 20 is a diagram illustrating a method for monitoring UE reachability according to an embodiment of the present invention.

Referring to FIG. 20, the MME/SGSN receives a monitoring request message from the HSS (i.e., through the SCEF and HSS from the SCS/AS) (S2001).

In this case, the monitoring request message is only an example of a message for requesting the monitoring of a monitoring event (i.e., UE reachability) configured in the MME/SGSN and may be denoted as another name or a previously defined message may be used.

For example, the UE reachability notification request (UE-REACHABILITY-NOTIFICATION-REQUEST) message shown in FIG. 19 may be used as the monitoring request message. Furthermore, an insert subscriber data request message may be used as the monitoring request message.

In this case, the MME/SGSN may perform step 1 of FIG. 18. At the same time, the MME/SGSN may receive the monitoring request message (e.g., the UE reachability notification request (UE-REACHABILITY-NOTIFICATION-REQUEST) message), may determine that a report for a monitoring event (i.e., UE reachability) needs to be stored in the MM context of the corresponding UE, and may store the report.

In this case, the SCS/AS may provide notification that downlink data to be transmitted is present explicitly or implicitly while registering (or configuring) monitoring event (i.e., UE reachability) reporting. That is, the SCS/AS may explicitly indicate that such downlink data is present through the monitoring request message. In some embodiments, if the UE is reachable, the SCS/AS may implicitly indicate that the downlink data is present by indicating the time when reachability needs to be guaranteed through the monitoring request message.

When monitoring event (i.e., UE reachability) reporting is instructed along with an explicit or implicit indication indicating that data needs to be transmitted at step S2001, the MME/SGSN determines a power saving function applied to the UE (S2002).

If, as a result of the determination at step S2002, it is determined that extended DRX is applied to the UE, the MME/SGSN sends paging to the UE (i.e., through an eNB) (S2003).

When receiving S1AP paging (i.e., a paging message) from the MME/SGSN as in the example of FIG. 14, the eNB sends RRC paging (i.e., paging information) to the UE in the Paging Occasion (PO) of the UE.

In this case, although a downlink data notification message is not received from the S-GW, the MME/SGSN determines that downlink data to be transmitted to the UE as the explicit or implicit information received at step S2001 is present and may send paging to the eNB(s) in the occasion when the paging is able to be transmitted.

The MME/SGSN detects a monitoring event (i.e., UE reachability) (S2004).

The UE reachability may indicate an occasion when the UE becomes reachable in order to send SMS messages or downlink data to the corresponding UE.

The UE reachability may be detected when the UE switches to ECM_CONNECTED mode.

If, as a result of the determination at step S2002, it is determined that power saving mode is applied to the UE, the MME/SGSN may detect a monitoring event (i.e., UE reachability) while waiting for a movement of the UE.

For example, when the UE switches to connected mode by performing a service request procedure (i.e., sends the service request message at steps 1 and 2 of FIG. 12) or a TAU/RAU operation (i.e., sends the TAU request message at steps 1 and 2 of FIG. 15), the MME/SGSN may detect a monitoring event (i.e., UE reachability).

If, as a result of the determination at step S2002, it is determined that extended DRX is applied to the UE, the MME/SGSN may detect a monitoring event (i.e., UE reachability) when the UE that has received paging from the MME/SGSN switches to connected mode by performing a service request procedure (i.e., the UE that has received paging performs the service request procedure at step 5 of FIG. 13).

When detecting the monitoring event (i.e., UE reachability) at step S2004 (i.e., when the UE becomes reachable), the MME/SGSN sends a UE reachability notification/report to the SCEF (or HSS) (S2005).

In this case, the UE reachability notification/report is only an example of a message for indicating that the monitoring event (i.e., UE reachability) configured in the MME/SGSN has been detected and may be called another name or a previously defined message may be used as the UE reachability notification/report.

For example, a monitoring indication message may be used as the UE reachability notification/report.

If power saving mode is applied to the UE, when the UE becomes reachable by performing a periodic TAU/RAU procedure (i.e., send the TAU request message at steps 1 and 2 of FIG. 15) or attempts a UE-originated call (or mobile-originated call) (i.e., sends the service request message at steps 1 and 2 of FIG. 12), the MME/SGSN may detect a monitoring event (i.e., UE reachability) and send a UE reachability notification. Furthermore, the UE reachability notification may be delivered to the SCS/AS through the SCEF.

If extended DRX is applied to the UE, when the UE that has received the paging transmitted by the MME/SGSN in order to check UE reachability performs a service request procedure (i.e., the UE that has received the paging performs the service request procedure at step 5 of FIG. 13) and thus becomes reachable, the MME/SGSN detects a monitoring event (i.e., UE reachability) and may send a UE reachability notification. Furthermore, the UE reachability notification may be delivered to the SCS/AS through the SCEF.

Furthermore, the MME/SGSN may perform a proper operation (e.g., E-RAB setup) for sending downlink data to the UE.

When receiving the UE reachability notification from the MME/SGSN through the SCEF (and HSS), the SCS/AS may send downlink data to the UE. That is, the SCS/AS may send downlink data to be transmitted to the UE to the P-GW. The P-GW may deliver the downlink data to the UE through the S-GW and the eNB.

In this case, the MME/SGSN may maintain the UE in connected mode for a specific time based on explicit or implicit addition information (e.g., an indication indicating that downlink data is present or a reachability guarantee time) received from the SCS/AS although uplink data or downlink data is not immediately transmitted or received.

Embodiment 2

If DRX (or eDRX) is applied to UE, an immediate delivery required parameter indicating that the UE needs to switch to connected mode immediately, together with configuration for reporting of a UE reachability notification, may be additionally transmitted from the SAS/AS to the MME so that the UE switches to connected mode as soon as possible and sends data.

That is, the SCS/AS may deliver an explicit parameter (i.e., the immediate delivery required parameter) to the MME when configuring a monitoring event (i.e., UE reachability) so that the UE switches to connected mode as soon as possible in order to minimize latency for in the delivery of downlink data.

In this case, the immediate delivery required parameter may also be called another explicit name that requires the UE to switch to connected mode as soon as possible.

If the immediate delivery required parameter is provided and activated, the MME may perform the network-triggered service request operation of FIG. 13 (from steps 3a and 3b of FIG. 13) so that the UE may switch to connected mode.

Figure 21:
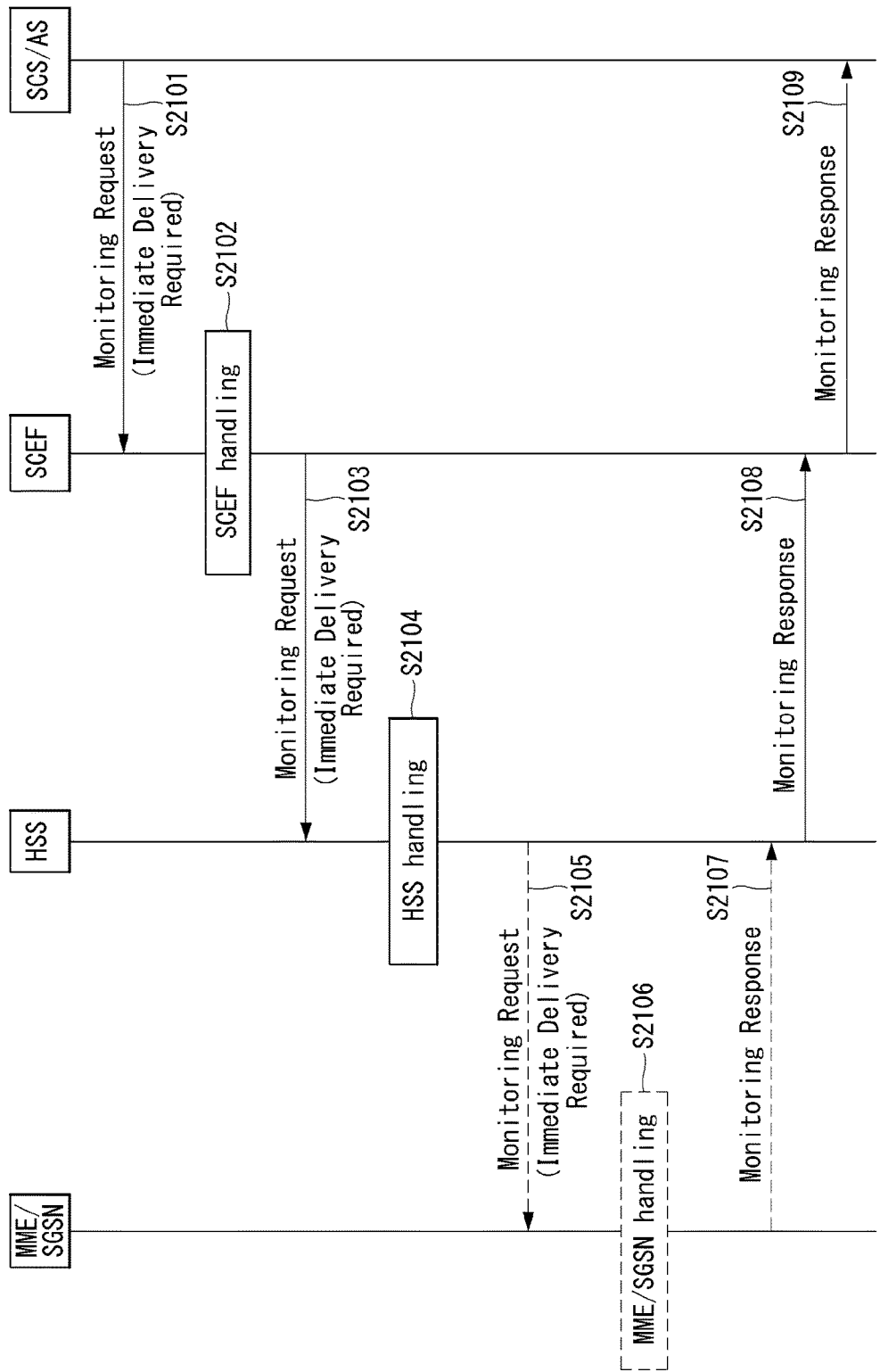
FIG. 21 is a diagram illustrating a monitoring event configuration procedure according to an embodiment of the present invention.

FIG. 21 is a diagram illustrating a monitoring event configuration procedure according to an embodiment of the present invention.

Referring to FIG. 21, the SCS/AS sends a monitoring request to the SCEF (S2101).

UE reachability may be indicative of an occasion when corresponding UE becomes reachable in order to send SMS messages or downlink data to the UE.

The UE reachability may be detected when the UE switches to ECM_CONNECTED mode.

A UE reachability monitoring event may support reachability for SMS and reachability for data. In relation to the reachability for SMS, only a one-time monitoring request may be supported.

The SCS/AS may include a monitoring event configuration request (i.e., a monitoring request message) in the following parameter(s).

That is, before the SCS/AS sends the monitoring request to the SCEF, it may include a reachability type in the monitoring request.

Furthermore, the SCS/AS may include maximum latency, a maximum response time and/or an immediate delivery required parameter selectively.

- A reachability type may indicate whether a corresponding monitoring request is a request for SMS or reachability for data or for both them.
- Selectively, maximum latency may indicate maximum latency acceptable for the delivery of downlink data. The maximum latency may be used to set the periodic TAU/RAU timer of corresponding UE to a maximum cycle. Thereafter, the UE needs to be connected to a network again. Accordingly, the UE becomes reachable. If maximum latency determined by an operator has a low value, PSM may be deactivated.
- Selectively, a maximum response time may indicate the time during which the state in which UE is reachable is maintained so that the SCS/AS can reliably deliver requested downlink data. The maximum response time may be used to set the active time of the UE.

Selectively, when (extended) idle mode DRX is applied to UE, an immediate delivery required parameter may indicate a need for the UE to wake up so that a serving MME/SGSN requests the UE to be paged.

Since maximum latency determines order of magnitude of a periodic update timer, a network needs to guarantee that the periodic TAU/RAU timer of UE preserves the battery of the UE based on the maximum latency and it is maintained higher than a lower bound value for managing a signaling load of the network. Accordingly, maximum latency should not be a small time (e.g., about several minute information) due to the battery constraint of the UE.

Although the battery constraint of the UE is not present, maximum latency may be applied to a limited number of pieces of UE due to a signaling cost introduced according to such a characteristic in order to satisfy maximum latency of about several minutes.

Maximum latency may be set to a number of times by one minute.

The SCEF stores a parameter included in the monitoring request message (S2102).

In this case, the SCEF may check whether the maximum latency and the maximum response time belong to a range defined by an operator policy. If the maximum latency and the maximum response time do not belong to the corresponding range, the SCEF may reject the request by sending a monitoring response having a proper cause value to the SCS/AS in accordance with the operator policy.

The SCEF sends the monitoring request message to the HSS (S2103).

In this case, when reachability for SMS is requested, the SCEF sends the monitoring request message to the HSS for registration so that the HSS notifies the SCEF that the UE is reachable when the MME notifies the HSS that the UE is reachable.

In this case, the HSS may perform a UE reachability notification request procedure in order to receive the UE activity notification.

When reachability for data is requested, the SCEF sends the monitoring request message to the HSS. In this case, the monitoring request message may include maximum latency, a maximum response time, and immediate delivery required, if provided.

The HSS checks whether a parameter included in the received monitoring request is within an acceptable range with respect to an operator (S2104).

In this case, if the parameter is acceptable, the HSS sets a subscribed periodic TAU/RAU timer to a maximum latency value (if it is provided). If a requested timer value is not acceptable, the HSS denies the monitoring request.

If the subscribed periodic RAU/TAU timer has been previously set by another monitoring request identified by another SCEF reference ID with respect to the same UE, the HSS denies or approves the monitoring request based on a proper reason according to an operator configuration. If the HSS approves the monitoring request, it cancels a monitoring request that has been previously approved.

The HSS sends the monitoring request message to the MME/SGSN (S2105).

In this case, the monitoring request message is only an example of a message for requesting the monitoring of a monitoring event (i.e., UE reachability) configured in the MME/SGSN and may be called another name or a previously defined message may be used as the monitoring request message.

For example, an insert subscriber data request message may be used as the monitoring request message.

In this case, the monitoring request message may include a subscribed periodic RAU/TAU timer (if it is adjusted), a maximum response time (if it is provided) and/or immediate delivery required (if it is provided).

The MME/SGSN stores a parameter within the received monitoring request message and starts to watch that the UE enters connected mode (S2106).

In each subsequent TAU/RAU procedure, the MME/SGSN applies the subscribed periodic RAU/TAU timer.

If the immediate delivery required of a value 1 is provided and (extended) idle mode DRX is applied to the UE, the MME/SGSN may perform the network-triggered service request (from steps 3a and 3b of FIG. 13) operation of FIG. 13.

If such a monitoring configuration is successful, the MME/SGSN sends a monitoring response message to the HSS (S2107).

In this case, the monitoring response message may be replaced with another message (e.g., an insert subscriber data response message).

The HSS sends the monitoring response message to the SCEF in order to notify the SCEF that the monitoring request message has been approved (S2108).

The SCEF sends the monitoring response message to the SCS/AS in order to notify the SCS/AS that the monitoring request message has been approved (S2109).

If the SCS/AS wants to send a downlink packet(s) as in the procedure of FIG. 21, the SCS/AS may request a one-time "UE reachability" monitoring event by sending a monitoring request message in which a reachability type is indicative of "reachability for data."

The SCS/AS sends packet data when it is notified that the UE is reachable.

In this case, if the SCS/AS selectively wants the delivery of downlink data to be fine-tuned within a time window in which the UE is reachable, the SCS/AS may set an optional parameter maximum response time having a proper value.

Furthermore, if the SCS/AS wants to send a downlink packet(s) as soon as possible, it may set an optional parameter "immediate delivery required."

When the optional parameter "immediate delivery required" is set as described above, if (extended) idle mode DRX is applied to the UE, the MME/SGSN may send paging to the UE rather than waiting for the UE entering connected mode. That is, the MME/SGSN may perform the network-triggered service request (from steps 3a and 3b of FIG. 13) operation of FIG. 13.

Figure 22:
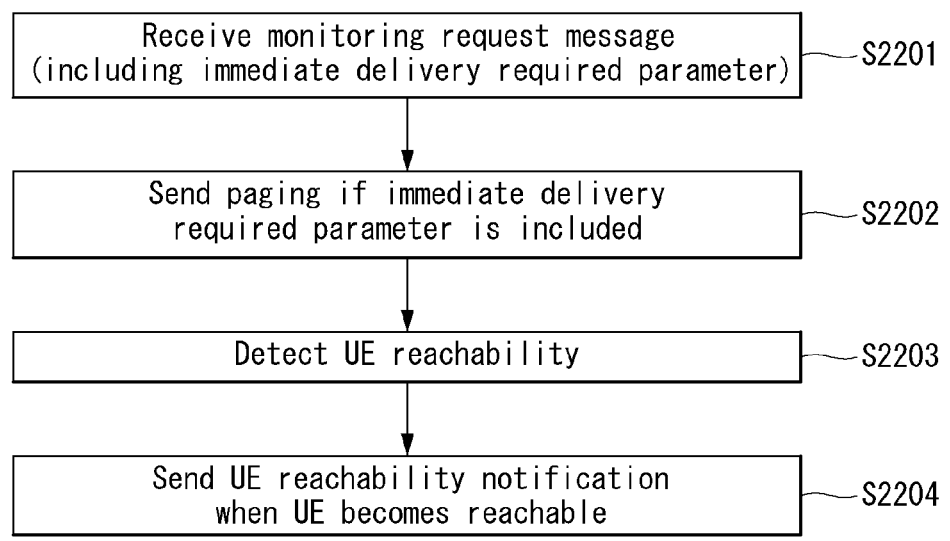
FIG. 22 is a diagram illustrating a method for monitoring UE reachability according to an embodiment of the present invention.

FIG. 22 is a diagram illustrating a method for monitoring UE reachability according to an embodiment of the present invention.

Referring to FIG. 22, the MME/SGSN receives a monitoring request message from the HSS (S2201).

In this case, the monitoring request message is only an example of a message for requesting the monitoring of a monitoring event (i.e., UE reachability) configured in the MME/SGSN and may be called another name or a previously defined message may be used as the monitoring request message.

For example, an insert subscriber data request message may be used as the monitoring request message.

In this case, the monitoring request message may include an immediate delivery required parameter.

If eDRX is applied to UE and the monitoring request message includes an immediate delivery required parameter, the MME/SGSN sends paging to the UE (i.e., through an eNB) (S2202).

When S1AP paging is received from the MME/SGSN as in the example of FIG. 14, the eNB sends RRC paging to the UE in the Paging Occasion (PO) of the UE.

The MME/SGSN detects a monitoring event (i.e., UE reachability) (S2203).

When the UE that has received paging from the MME/SGSN switches to connected mode by performing a service request procedure (i.e., the UE performs the service request procedure of step 5 in FIG. 13), the MME/SGSN may detect the monitoring event (i.e., UE reachability).

When detecting the monitoring event (i.e., UE reachability) is detected at step S2203 (i.e., the UE becomes reachable), the MME/SGSN sends a UE reachability notification/report to the SCEF (or the HSS) (S2204).

In this case, the UE reachability notification/report is only an example of a message for indicating that the monitoring event (i.e., UE reachability) configured in the MME/SGSN has been detected and may be called another name or a previously defined message may be used as the UE reachability notification/report.

For example, a monitoring indication message may be used as the UE reachability notification/report.

That is, when the UE that has received the paging transmitted by the MME/SGSN for a reachability check becomes reachable by performing the service request procedure (i.e., the UE performs the service request procedure of step 5 in FIG. 13), the MME/SGSN detects that the UE becomes reachable and may send a UE reachability notification. Furthermore, the UE reachability notification may be delivered to the SCS/AS through the SCEF.

Furthermore, the MME/SGSN may perform a proper operation (e.g., E-RAB setup) for sending downlink data to the UE.

Thereafter, when receiving the UE reachability notification from the MME/SGSN through the SCEF (and the HSS), the SCS/AS may send downlink data to the UE. That is, the SCS/AS sends downlink data to be transmitted to the UE to the P-GW. The P-GW may send downlink data to the UE through the S-GW and the eNB.

In this case, the MME/SGSN may maintain the UE in connected mode for a specific time so that the downlink data is reliably transmitted from the SCS/AS to the UE.

Embodiment 3

An embodiment of the present invention proposes an operation for minimizing latency for the delivery of downlink data without the immediate delivery required proposed in the aforementioned embodiment 2. That is, in the present embodiment, if the MME predicts the paging occasion of UE and expects that paging may be able to be transmitted, it may provide notification of UE reachability and report the UE reachability before a next Paging Occasion (PO) of the UE. This is described below with reference to FIG. 23.

Figure 23:
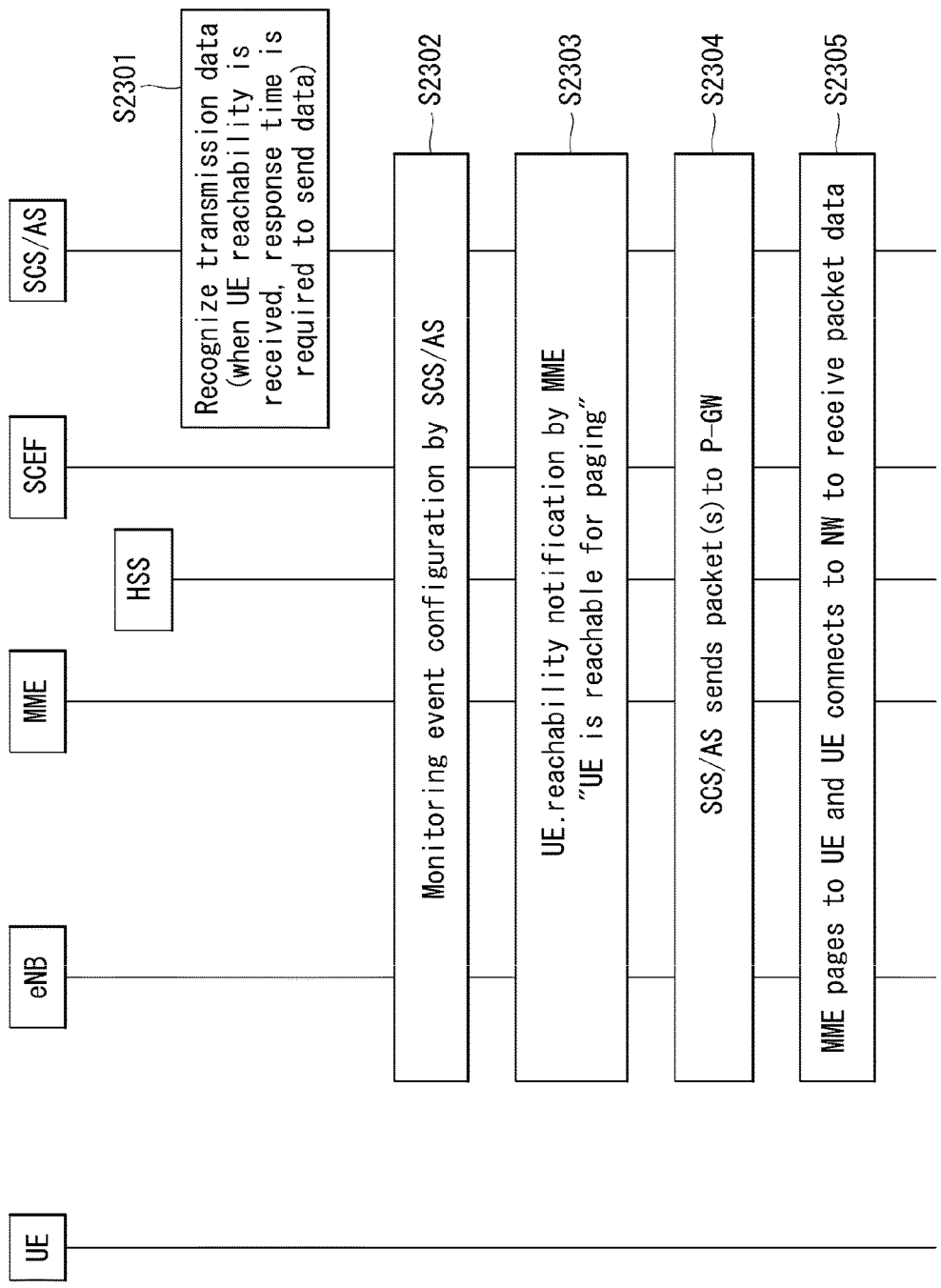
FIG. 23 is a diagram illustrating a method for monitoring UE according to an embodiment of the present invention.

FIG. 23 is a diagram illustrating a method for monitoring UE according to an embodiment of the present invention.

Referring to FIG. 23, the SCS/AS recognizes data (or a packet) to be transmitted to UE (S2301).

The SCS/AS sends a monitoring request message for a monitoring event to the SCEF, so a monitoring event configuration procedure is performed by the SCS/AS (S2302).

That is, if data needs to be transmitted at step S2301, the SCS/AS may configure a "UE reachability monitoring event" in order to receive the reachability notification of the UE through the SCEF.

In this case, the SCS/AS may set the following parameters when requesting a monitoring request from the SCEF.

A monitoring type: UE reachability

A maximum number of reports: a one-time report

A maximum response time: a response time that is necessary for the SCS/AS to send packet data to the UE through the P-GW after receiving the reachability notification of UE As described above, if a replay time (i.e., a response time) for sending data to UE is required when the reachability of the UE is received, the SCS/AS may set a maximum response time. In this case, the maximum response time may indicate the time during which the state in which the UE is reachable is maintained so that the SCS/AS may deliver required data reliably.

As described above, the SCS/AS may include a set parameter in a monitoring request message and send the monitoring request message to the SCEF.

If a UE reachability monitoring event has been configured, when the MME/SGSN detects that the UE is reachable for paging, the MME/SGSN performs a UE reachability notification procedure (S2303).

When the MME/SGSN notifies the SCS/AS of UE reachability, it sends data (or a packet) to the P-GW (S2304).

The P-GW delivers the received data (or packet) to the S-GW. The S-GW may deliver the received data (or packet) to the UE through an eNB.

That is, when receiving the UE reachability from the SCEF through the MME/SGSN, the SCS/AS sends the data to the UE. In this case, while the packet data is delivered to the S-GW through the P-GW, it may be delivered to an EPC network.

The MME/SGSN sends paging to the UE. The UE accesses a network (NW) in order to receive the data (S2305).

If the S-GW has received the data according to step S2304, but a user plane has not been set up in the UE, a network-triggered service request procedure may be performed as in the example of FIG. 13.

That is, the S-GW may send a downlink data notification (DDN) to the MME/SGSN (step 2a of FIG. 13) and buffer the received data. When receiving the DDN from the S-GW, the MME/SGSN may send paging to the UE by calculating the paging occasion of the UE (step 3a or 3b of FIG. 13). When the UE receives the paging in its own paging occasion, it may send a service request to the MME/SGSN as a response to the paging. When the MME/SGSN receives the service request from the UE, it may set up user plane connection between the UE and the S-GW (step 5 of FIG. 13). When user plane connection between the UE and the S-GW is set up, the S-GW may send the buffered data to the UE.

Steps S2302 and S2303 of FIG. 23 are described in more detail below.

Figure 24:
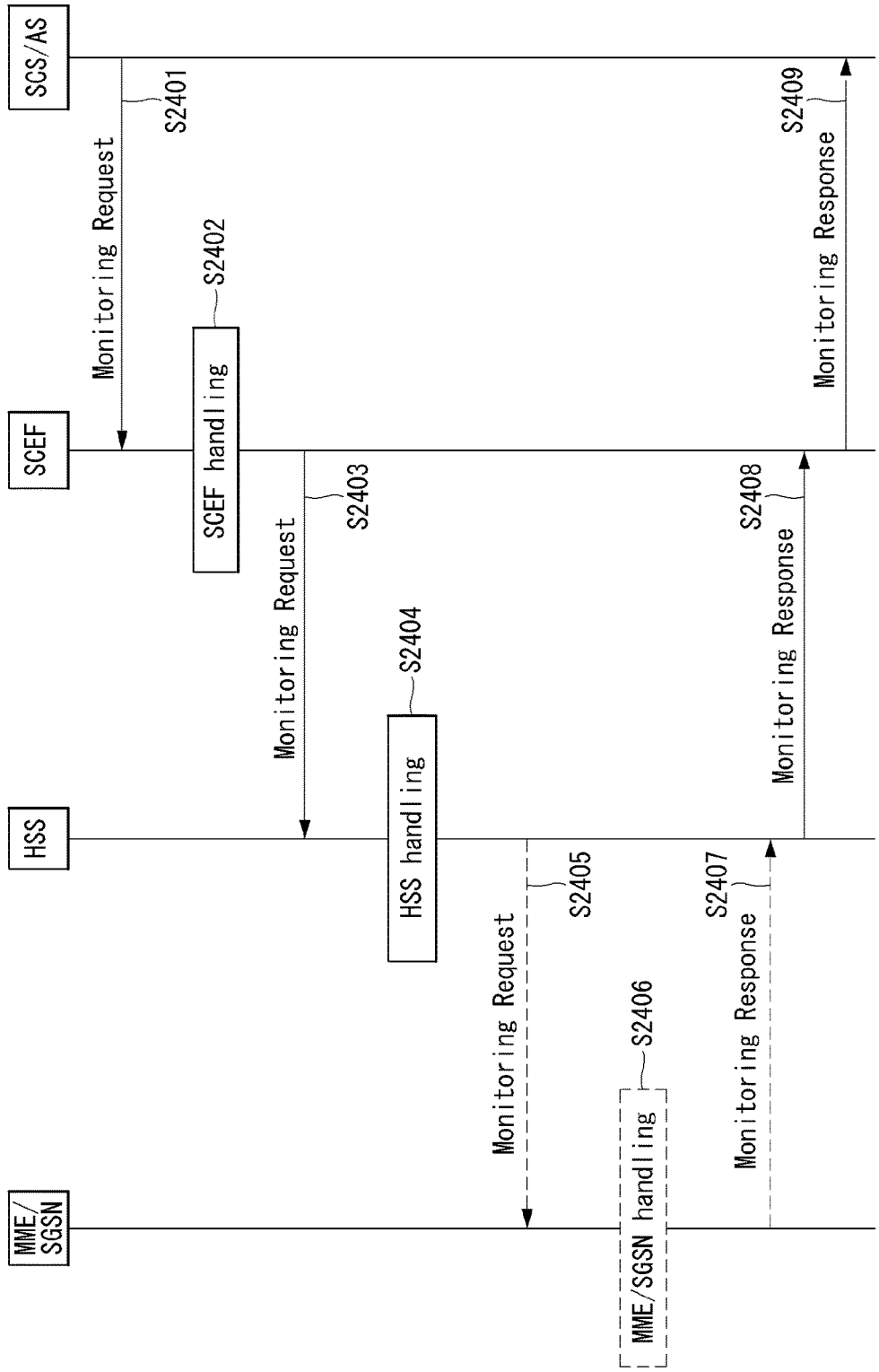
FIG. 24 is a diagram illustrating a method for monitoring UE reachability according to an embodiment of the present invention.

FIG. 24 is a diagram illustrating a method for monitoring UE reachability according to an embodiment of the present invention.

FIG. 24 illustrates step S2302 of FIG. 23 in more detail.

Referring to FIG. 24, the SCS/AS sends a monitoring request to the SCEF (S2401).

UE reachability may indicate an occasion when UE becomes reachable in order to send SMS messages or downlink data to the UE.

UE reachability may be detected when UE switches to ECM_CONNECTED mode (i.e., in the case of UE using power saving mode (PSM) or extended idle mode DRX), or UE reachability may be detected when UE is expected to be reachable in order to send paging to the UE (i.e., in the case of UE using extended idle mode DRX).

A UE reachability monitoring event may support reachability for SMS and reachability for data. Only a one-time monitoring request may be supported for reachability for SMS.

The SCS/AS may include a monitoring event configuration request (i.e., a monitoring request message) in the following parameter(s).

That is, the SCS/AS may include a reachability type in a monitoring request before sending the monitoring request to the SCEF.

Furthermore, the SCS/AS may include maximum latency and/or a maximum response time selectively.

A reachability type may indicate whether a corresponding monitoring request is a request for SMS or reachability for data or for both them.

Selectively, maximum latency may indicate maximum latency acceptable for the delivery of downlink data. The maximum latency may be used to set the periodic TAU/RAU timer of corresponding UE to a maximum cycle. Thereafter, the UE needs to be connected to a network again. Accordingly, the UE becomes reachable. If maximum latency determined by an operator has a low value, PSM may be deactivated.

Selectively, a maximum response time may indicate the time during which the state in which UE is reachable is maintained so that the SCS/AS can reliably deliver requested downlink data. The maximum response time may be used to set the active time of the UE. Furthermore, if UE uses extended idle mode DRX, the maximum response time may be used to determine that how early a monitoring event needs to be reported to the SCS/AS before a next paging occasion is generated. This is described in more detail later.

Since maximum latency determines order of magnitude of a periodic update timer, a network needs to guarantee that the periodic TAU/RAU timer of UE preserves the battery of the UE based on the maximum latency and it is maintained higher than a lower bound value for managing a signaling load of the network. Accordingly, maximum latency should not be a small time (e.g., about several minute information) due to the battery constraint of the UE.

Although the battery constraint of the UE is not present, maximum latency may be applied to a limited number of pieces of UE due to a signaling cost introduced according to such a characteristic in order to satisfy maximum latency of about several minutes.

Maximum latency may be set to a number of times by one minute.

The SCEF stores a parameter included in the monitoring request message (S2402).

In this case, the SCEF may check whether the maximum latency and the maximum response time belong to a range defined by an operator policy. If the maximum latency and the maximum response time do not belong to the corresponding range, the SCEF may reject the request by sending a monitoring response having a proper cause value to the SCS/AS in accordance with the operator policy.

The SCEF sends the monitoring request message to the HSS (S2403).

In this case, when reachability for SMS is requested, the SCEF sends the monitoring request message to the HSS for registration so that the HSS notifies the SCEF that the UE is reachable when the MME notifies the HSS that the UE is reachable.

In this case, the HSS may perform a UE reachability notification request procedure in order to receive the UE activity notification.

When reachability for data is requested, the SCEF sends the monitoring request message to the HSS. In this case, the monitoring request message may include maximum latency, a maximum response time, and immediate delivery required, if provided.

The HSS checks whether a parameter included in the received monitoring request is within an acceptable range with respect to an operator (S2404).

In this case, if the parameter is acceptable, the HSS sets a subscribed periodic TAU/RAU timer to a maximum latency value (if it is provided). If a requested timer value is not acceptable, the HSS denies the monitoring request.

If the subscribed periodic RAU/TAU timer has been previously set by another monitoring request identified by another SCEF reference ID with respect to the same UE, the HSS denies or approves the monitoring request based on a proper reason according to an operator configuration. If the HSS approves the monitoring request, it cancels a monitoring request that has been previously approved.

The HSS sends the monitoring request message to the MME/SGSN (S2405).

In this case, the monitoring request message is only an example of a message for requesting the monitoring of a monitoring event (i.e., UE reachability) configured in the MME/SGSN and may be called another name or a previously defined message may be used as the monitoring request message.

For example, an insert subscriber data request message may be used as the monitoring request message.

In this case, the monitoring request message may include a subscribed periodic RAU/TAU timer (if it is adjusted) and/or immediate delivery required (if it is provided).

The MME/SGSN stores a parameter within the received monitoring request message and starts to monitor that the UE enters connected mode (S2406).

In each subsequent TAU/RAU procedure, the MME/SGSN applies the subscribed periodic RAU/TAU timer.

If such a monitoring configuration is successful, the MME/SGSN sends a monitoring response message to the HSS (S2407).

In this case, the monitoring response message may be replaced with another message (e.g., an insert subscriber data response message).

The HSS sends the monitoring response message to the SCEF in order to notify the SCEF that the monitoring request message has been approved (S2408).

The SCEF sends the monitoring response message to the SCS/AS in order to notify the SCS/AS that the monitoring request message has been approved (S2409).

If the SCS/AS wants to send a downlink packet(s) as in the procedure of FIG. 24, the SCS/AS may request a one-time "UE reachability" monitoring event by sending a monitoring request message in which a reachability type is indicative of "reachability for data."

The SCS/AS sends packet data when it is notified that the UE is reachable.

In this case, if the SCS/AS selectively wants the delivery of downlink data to be fine-tuned within a time window in which the UE is reachable, the SCS/AS may set an optional parameter maximum response time having a proper value.

Figure 25:
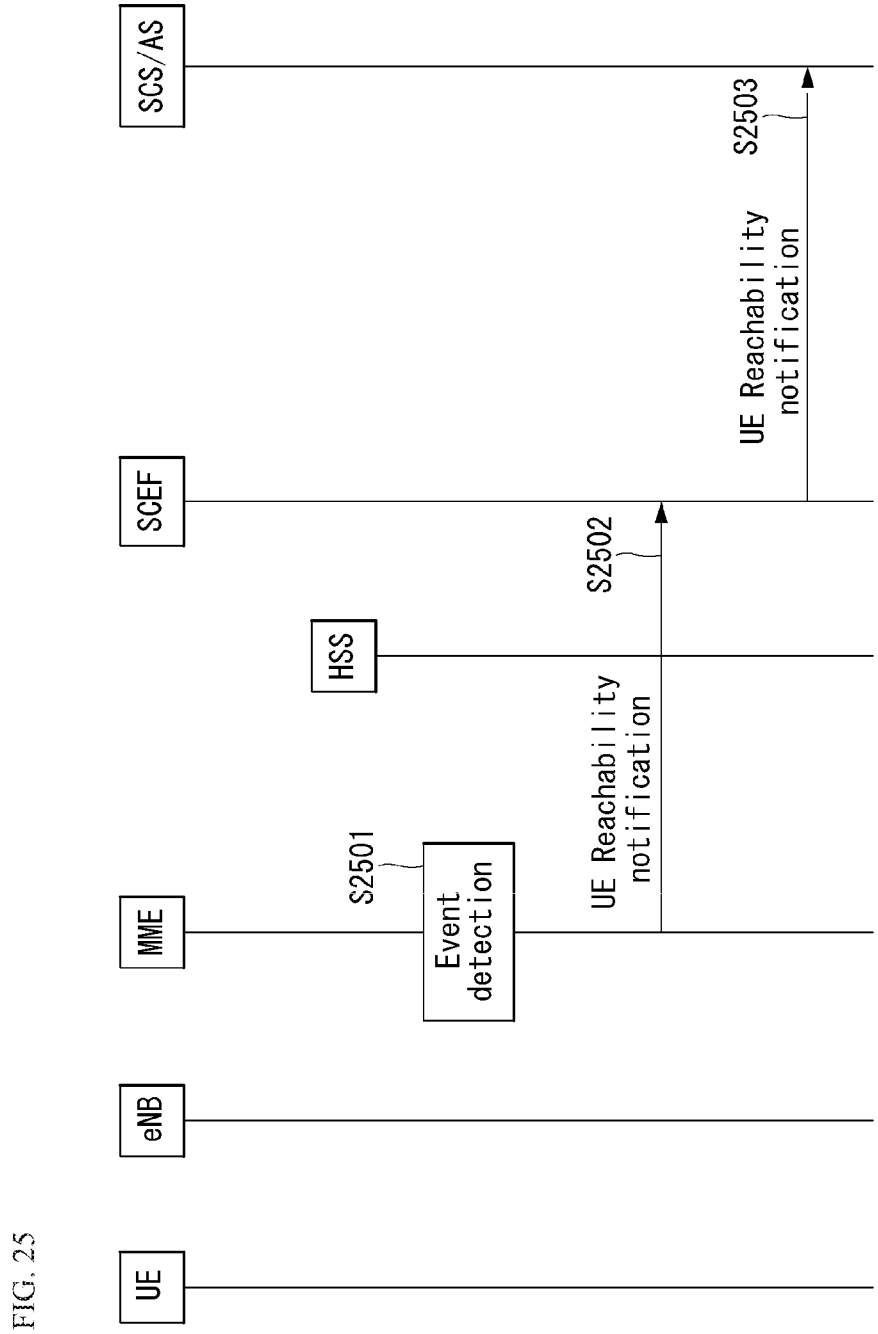
FIG. 25 is a diagram illustrating a method for monitoring UE reachability according to an embodiment of the present invention.

FIG. 25 is a diagram illustrating a method for monitoring UE reachability according to an embodiment of the present invention.

FIG. 25 illustrates step S2303 of FIG. 23 in more detail.

Referring to FIG. 25, the MME/SGSN detects a monitoring event (i.e., UE reachability) (S2501).

That is, when a monitoring event is configured in the MME/SGSN based on a monitoring request message, the MME/SGSN detects whether paging is possible by predicting the paging occasion of UE if extended idle mode DRX is applied to the UE. That is, if it is expected that paging can be transmitted to the UE, the MME/SGSN may determine that a UE reachability monitoring event has been detected.

In other words, if the UE uses Power Saving Mode (PSM) or extended idle mode DRX, when the UE switches to ECM_CONNECTED mode, a monitoring event (i.e., UE reachability) may be detected. Further, if the UE uses extended idle mode DRX, when it is expected that the UE will be reachable in order to send paging to the UE, a monitoring event) (i.e., UE reachability) may be detected.

When the monitoring event (i.e., UE reachability) is detected, the MME/SGSN sends a UE reachability notification/report to the SCEF (or through the HSS) (S2502).

That is, if extended idle mode DRX is applied to the UE, the MME/SGSN may predict the paging occasion of the UE and notify the SCS/AS whether paging is possible through the SCEF.

In other words, if extended idle mode DRX is applied to the UE, when it is expected that the UE becomes reachable in order to send the paging to the UE (i.e., when the UE will become reachable for paging), the MME/SGSN may determine that a monitoring event has been detected and send a UE reachability notification to the SCEF.

Furthermore, before the MME/SGSN notifies the UE that the UE is reachable by the paging, when the MME/SGSN recognizes that the UE has switched to connected mode (i.e., detects a monitoring event) because the UE performed a periodic TAU/RAU procedure (i.e., sent the TAU request message at steps 1 and 2 of FIG. 15) or attempted a UE-originated call (or mobile-originated call) (i.e., sent the service request message at steps 1 and 2 of FIG. 12), the MME/SGSN may send the UE reachability notification to the SCEF.

In this case, the UE reachability notification/report is only an example of a message for indicating the monitoring event (i.e., UE reachability) configured in the MME/SGSN has been detected and may be called another name or a previously defined message may be used as the UE reachability notification/report.

For example, a monitoring indication message may be used as the UE reachability notification/report.

The SCEF sends the UE reachability notification to the SCS/AS (S2503).

When the SCS/AS receives the UE reachability notification as in FIG. 25, it sends packet data (i.e., downlink data) to the P-GW. Accordingly, as in the example of FIG. 13, a user plane bearer is set up according to a network-triggered service request procedure, and packet data is delivered to the UE.

In this case, the MME/SGSN may notify the SCS/AS of the UE reachability notification in advance through the SCEF by taking a sufficient time into consideration, that is, by taking into consideration the time taken for the SCS/AS to be able to receive the UE reachability notification and to send the packet data (i.e., a response time taken for the SCS/AS to send downlink data after receiving the UE reachability notification) prior to the paging occasion of the UE.

In this case, the MME/SGSN may calculate an occasion when it reports the UE reachability notification to the SCS/AS using a maximum response time, that is, a parameter transmitted by the SCS/AS when it configures the monitoring event (i.e., within the monitoring request message). That is, the MME/SGSN may use a maximum response time in order to determine how early the UE reachability notification should be transmitted to the SCS/AS before a next paging occasion of the UE occurs.

This is described below with reference to FIG. 26.

Figure 26:
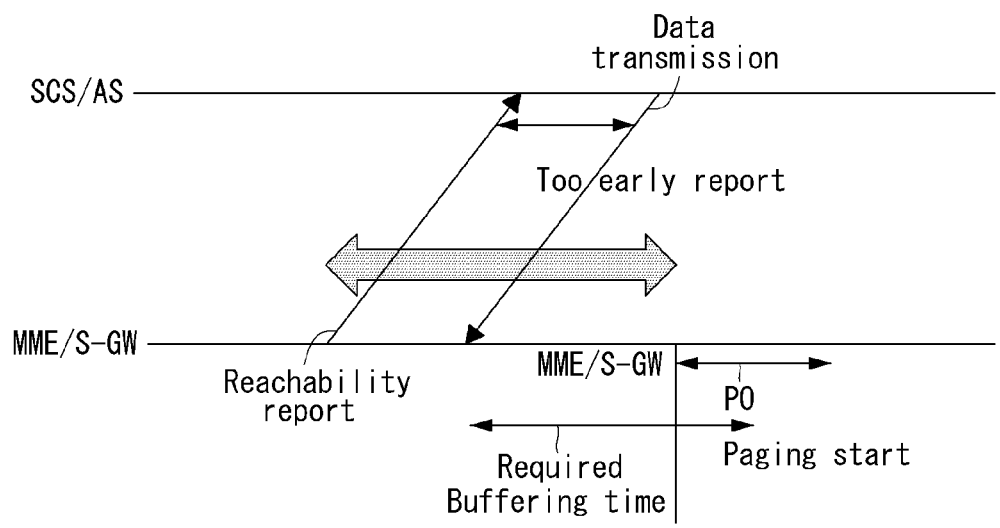
FIG. 26 is a diagram illustrating a method for setting an occasion when a UE reachability notification is transmitted according to an embodiment of the present invention.

FIG. 26 is a diagram illustrating a method for setting an occasion when a UE reachability notification is transmitted according to an embodiment of the present invention.

If the MME/SGSN reports a UE reachability notification to the SCS/AS too early prior to the substantial Paging Occasion (PO) of UE as in FIG. 26, the SCS/AS sends downlink data to a network (e.g., through an SGi interface) prior to the Paging Occasion (PO) of the UE in case that the maximum response time of the SCS/AS is not long.

In this case, if a corresponding S-GW is unable to guarantee a sufficiently long buffering time for downlink data, it may send paging to the UE according to the network-triggered service request procedure of FIG. 13, so the S-GW may discard the downlink data received from the SCS/AS due to an excess of a storage time before a user plane bearer is set up.

That is, if the downlink data is transmitted by the SCS/AS before the user plane bearer is set up by the paging and such a time interval exceeds the time taken for the S-GW to buffer the downlink data, the S-GW may discard corresponding packet data (i.e., downlink data).

Furthermore, if the SCS/AS sends the downlink data before the MME/SGSN sends the paging to the UE when the S-GW does not support extended buffering, the S-GW may discard the corresponding packet data (i.e., downlink data), if necessary.

Accordingly, the time when the MME/SGSN reports a UE reachability notification needs to be set so that the triggering of the paging transmitted by the MME/SGSN is generated within the time when the S-GW is capable of buffering.

Accordingly, the MME/SGSN may report the UE reachability notification by taking into consideration a response time (i.e., a maximum response time taken to send the downlink data after the SCS/AS receives UE reachability notification reporting).

If the maximum response time is equal to or smaller than 0, the MME/SGSN may report the UE reachability notification to the SCS/AS through the SCEF right before the paging occasion of the UE. Accordingly, when the SCS/AS sends the downlink data right before the paging occasion of the UE, the MME/SGSN may send the paging to the UE (i.e., through an eNB) right before the paging occasion of the UE.

In contrast, if the maximum response time is great, the MME/SGSN may report the UE reachability notification to the SCS/AS long before the paging occasion of the UE. Accordingly, although the time taken for the SCS/AS to send the downlink data (i.e., a response time taken to send the downlink data after the UE reachability notification is received) is great after the SCS/AS receives UE reachability, the MME/SGSN may send paging to the UE (i.e., through an eNB) near the paging occasion of the UE.

A method for calculating, by the MME/SGSN, an occasion when a UE reachability notification is transmitted by taking a maximum response time into consideration is described in detail below.

First, the MME/SGSN may calculate a next paging occasion of UE as follows.

Paging for Extended Idle Mode DRX

A method for determining a paging occasion for UE to which eDRX is applied is described below.

If extended idle mode DRX is applied to UE, the UE is reachable by paging in a specific Paging Hyper-frame (PH).

The PH means a specific set of Hyper-System Frame Number (H-SFN) values. The PH may be calculated using an extended idle mode DRX cycle and a UE-specific ID (e.g., an IMSI).

An H-SFN frame structure is defined as the highest value of an SFN used for common idle mode DRX. That is, a single hyper-frame includes 1024 radio frames (i.e., 10.24 seconds). Accordingly, whenever the SFN is wrapped around, the H-SFN is increased by 1.

The value of an extended idle mode DRX cycle may be started from 5.12 seconds and increased up to a maximum of 2621.44 seconds (43.69 minutes) (i.e., 5.12, 10.24, 20.48 seconds, etc.) two times.

The PH value may be calculated in all types of UE and the MME/SGSN(s) without any signaling. The MME/SGSN includes the length of an extended idle mode DRX cycle in a paging message in order to support that an eNB pages UE.

Furthermore, the MME/SGSN assigns the length of a Paging Time Window (PTW) (or a Paging Window (PW)) and provides the UE with a PTW length value along with the length of the extended idle mode DRX cycle during an attach and/or TAU procedure.

The first Paging Occasion (PO) of UE is included in a PH. It is assumed that the UE is reachable by paging during an additional PTW length after the first PO. After the PTW length, the MME/SGSN considers the UE to be unreachable by paging until a next PH.

extended DRX (eDRX) cycle 'T_eDRX' may be configured in UE by a higher layer (e.g., RRC layer). The UE may operate in eDRX mode only when a cell indicates that it supports eDRX within system information.

If the T_eDRX cycle of UE is set as a 512 radio frame (i.e., 5.12 seconds), the UE applies 512 to a DRX cycle 'T' value and monitors a Paging Occasion (PO) defined according to Equations 1 and 2.

If not, 'T' is determined to be a shorter value of a UE-specific DRX cycle (if it is assigned by a higher layer) and a default paging cycle (a 'defaultPagingCycle' field value) broadcasted through system information. Furthermore, UE in which eDRX mode has been set monitors a PO based on a previously determined 'T' value during a configured periodic paging window.

The paging window (i.e., PTW) is configured in a UE-specific way and is determined by a Paging Hyper-frame (PH), a starting position 'PW_start' within the PH, and an ending position (ending position) 'PW_end' within the PH.

The PH, PW_start, and PW_end are determined as follows.

The PH is an H-SFN satisfying Equation 3 below.

$$\text{H-SFN} \bmod T_{eDRX,H} = (\text{UE\_ID} \bmod T_{eDRX,H}) \quad (3)$$

In Equation 3, UE_ID denotes (IMSI mod 1024). T_eDRX, H is the eDRX cycle (T_eDRX, H=1, 2, ..., 256 hyper frame(s)) of UE represented by a hyper-frame and is set by a higher layer.

The PW_start is the first radio frame of a PH, that is, part of a paging window and is a System Frame Number (SFN) satisfying Equation 4 below.

$$\text{SFN} = 256 * i_{eDRX} \quad (4)$$

In Equation 4, i_eDRX=floor (UE_ID/T_eDRX,H) mod 4. In this case, floor (x) operation means a maximum integer not greater than "x."

The PW_end is the last radio frame of a paging window and is a System Frame Number (SFN) satisfying Equation 5 below.

$$\text{SFN} = (\text{PW\_start} + L*100 - 1) \bmod 1024 \quad (5)$$

In Equation 5, L is a paging window length (in second) set by a higher layer.

That is, a Paging Hyper-frame (PH) is configured in UE for each eDRX cycle (T_eDRX,H) (i.e., 5.12, 10.24, ..., 2621.44 seconds) represented as a hyper-frame. Furthermore, a paging time window (or paging window) is configured from PW_start to PW_end within a PH. Furthermore, paging is monitored in a Paging Occasion (PO) (i.e., if an eDRX cycle is 512 radio frames) calculated based on the eDRX cycle of UE within a configured paging window or a Paging Occasion (PO) (i.e., if an eDRX cycle is not 512 radio frames) calculated based on a common DRX cycle and a default paging cycle.

As described above, the MME/SGSN may calculate the paging occasion of UE. In this case, the MME/SGSN may assume that it has been synchronized with an eNB through loose synchronization 2.56 seconds or less.

The MME/SGSN may send an SLAP paging message along with a PTW value within a paging occasion calculated as described above so that the UE can receive paging reliably.

In this case, the PTW corresponds to the time corresponding to several times of common paging (a maximum 2.56 seconds). When receiving the PTW within the S1AP paging message, an eNB repeatedly sends an RRC paging message to the UE at an interval of a common paging cycle (e.g., 1 second to 2 seconds) for a corresponding PTW time (e.g., 2 to 5 seconds) or for an internally set time if it does not receive the PTW within the S1AP paging message or.

As a result, the MME/SGSN may calculate an occasion when it reports a UE reachability notification as in Equation 6 below.

$$t = T - \text{maximum response time} - \text{signaling latency} \quad (6)$$

In Equation 6, 't' denotes an occasion when a UE reachability notification is reported, and 'T' denotes the paging occasion of UE.

That is, the MME/SGSN detects that the UE is reachable at step S2502 of FIG. 25 and sends the UE reachability notification to the SCEF at a point of time T at which it reports the UE reachability notification as in step S2503.

As above mentioned, the maximum response time included in the monitoring request message may be used to determine how early the UE reachability notification should be reported to the SCS/AS (i.e., the point of time 't') before a next paging occasion of the UE occurs (i.e., the point of time 'T').

Figure 27:
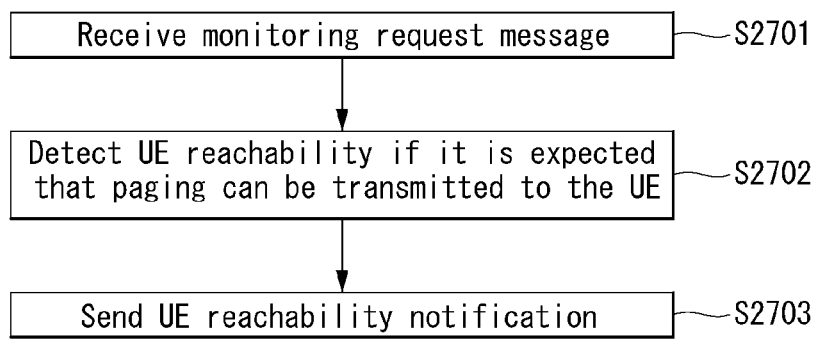
FIG. 27 is a diagram illustrating a method for monitoring UE reachability according to an embodiment of the present invention.

FIG. 27 is a diagram illustrating a method for monitoring UE reachability according to an embodiment of the present invention.

Referring to FIG. 27, the MME/SGSN receives a monitoring request message from the HSS (S2701).

In this case, the monitoring request message may include a maximum response time parameter.

In this case, the monitoring request message is only an example of a message for requesting the monitoring of a monitoring event (i.e., UE reachability) configured in the MME/SGSN and may be called another name or a previously defined message may be used as the monitoring request message.

For example, an insert subscriber data request message may be used as the monitoring request message.

If eDRX is applied to UE, the MME/SGSN detects UE reachability if it is expected that paging can be transmitted to the UE (S2702).

That is, if eDRX is applied to UE, when it is expected that the UE becomes reachable in order to send paging to the UE (i.e., when the UE will become reachable for paging), the MME/SGSN may detect UE reachability.

In this case, the MME/SGSN may determine an occasion when a UE reachability notification is transmitted.

As described above, the MME/SGSN may determine an occasion when the UE reachability notification is transmitted by taking into consideration the time taken for the SCS/AS to be able to receive the UE reachability notification and to send packet data (i.e., a response time taken for the SCS/AS to send downlink data after receiving the UE reachability notification) before the paging occasion of the UE.

Furthermore, the MME/SGSN may determine when to transmit the UE reachability notification by taking into consideration a maximum response time (included in the monitoring request message) before the paging occasion of the UE.

That is, the maximum response time included in the monitoring request message may be used to determine how early the UE reachability notification should be reported to the SCS/AS before a next paging occasion of the UE occurs.

The MME/SGSN sends the UE reachability notification to the SCEF (or the HSS) (S2703).

In this case, if an occasion when the UE reachability notification is transmitted is determined at step S2702, the MME/SGSN may send the UE reachability notification to the SCEF (or the HSS) at the determined point of time.

Thereafter, when the SCS/AS receives the UE reachability notification from the MME/SGSN through the SCEF (and the HSS), it may send the downlink data to the UE. That is, the SCS/AS sends the downlink data to be transmitted to the UE to the P-GW. The P-GW may deliver the downlink data to the UE through the S-GW and an eNB.

In the aforementioned embodiments 1 and 2, after receiving the monitoring request message, the MME/SGSN sends the paging to the UE. Accordingly, when the UE is reachable, the MME/SGSN reports the UE reachability notification to the SCS/AS. In this case, since the SCS/AS sends the downlink data after receiving the UE reachability notification, the UE needs to maintain in connected mode for a specific time until it actually receives the downlink data.

In contrast, if the UE reachability notification is reported before the paging occasion of the UE (in particular, at a point of time calculated by taking a maximum response time into consideration), the time taken for the UE to maintain connected mode can be minimized because downlink data can be transmitted to the UE at a point of time closer to the paging occasion of the UE.

Furthermore, in the aforementioned embodiments 1 and 2, since the SCS/AS sends the downlink data after receiving the UE reachability notification, a user plane bearer for the UE needs to be maintained until the downlink data is actually delivered to the UE.

In contrast, if the UE reachability notification is reported before the paging occasion of the UE (in particular, at a point of time calculated by taking a maximum response time into consideration), the time taken for a user plane bearer for the UE to be maintained can be minimized because the downlink data can be transmitted to the UE at a point of time closer to the paging occasion of the UE.

Furthermore, in the aforementioned embodiments 1 and 2, the SCS/AS sends the downlink data after receiving the UE reachability notification. Accordingly, if the time until the downlink data is actually delivered to the UE is greater than the time taken to maintain a user plane bearer for the UE, a network-triggered service request procedure needs to be performed again in order to send the downlink data to the UE.

In contrast, if the UE reachability notification is reported before the paging occasion of the UE (in particular, at a point of time calculated by taking a maximum response time into consideration), a network-triggered service request procedure can be prevented from being performed again because the downlink data can be transmitted to the UE at a point of time closer to the paging occasion of the UE.

Furthermore, as described in the example of FIG. 26, if the S-GW does not support extended buffering or if downlink data is transmitted by the SCS/AS prior to an occasion when the S-GW is capable of buffering for the downlink data from an occasion when a user plane bearer is set up by paging, downlink data can be prevented from being discarded and smoothly transmitted to the UE.

General Apparatus to which the Present Invention May be Applied

Figure 28:
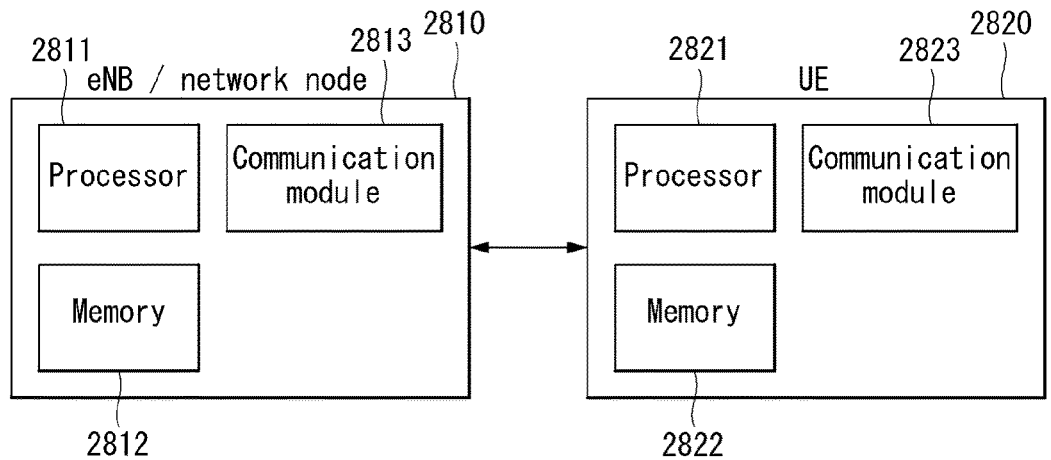
FIG. 28 shows a block diagram of a communication device according to an embodiment of the present invention.

FIG. 28 shows a block diagram of a communication device according to an embodiment of the present invention.

Referring to FIG. 28, a wireless communication system includes a network node 2810 and a plurality of pieces of UE 2820.

The network node 2810 includes a processor 2811, memory 2812, and a communication module 2813. The processor 2811 implements the functions, processes and/or methods proposed in FIGS. 1 to 27. The layers of wired/wireless radio interface protocols may be implemented by the processor 2811. The memory 2812 is connected to the processor 2811 and stores various types of information for driving the processor 2811. The communication module 2813 is connected to the processor 2811 and sends and/or receives wired/wireless signals. The network node 2810 may correspond to an eNB, an MME, an HSS, an SGW, a PGW, an SCEF, and an SCS/AS, for example. In particular, if the network node 2810 is an eNB, the communication module 2813 may include a Radio Frequency (RF) unit for sending/receiving radio signals.

The UE 2820 includes a processor 2821, memory 2822, and a communication module (or RF unit) 2823. The processor 2821 implements the functions, processes and/or methods proposed in FIGS. 1 to 27. The layers of wired/wireless radio interface protocols may be implemented by the processor 2821. The memory 2822 is connected to the processor 2821 and stores various types of information for driving the processor 2821. The communication module 2823 is connected to the processor 2821 and sends and/or receives wired/wireless signals.

The memory 2812, 2822 may be placed inside or outside the processor 2811, 2821 and connected to the processor 2811, 2821 by various well-known means. Furthermore, the network node 2810 (in the case of an eNB) and/or the UE 2820 may have a single antenna or multiple antennas.

Figure 29:
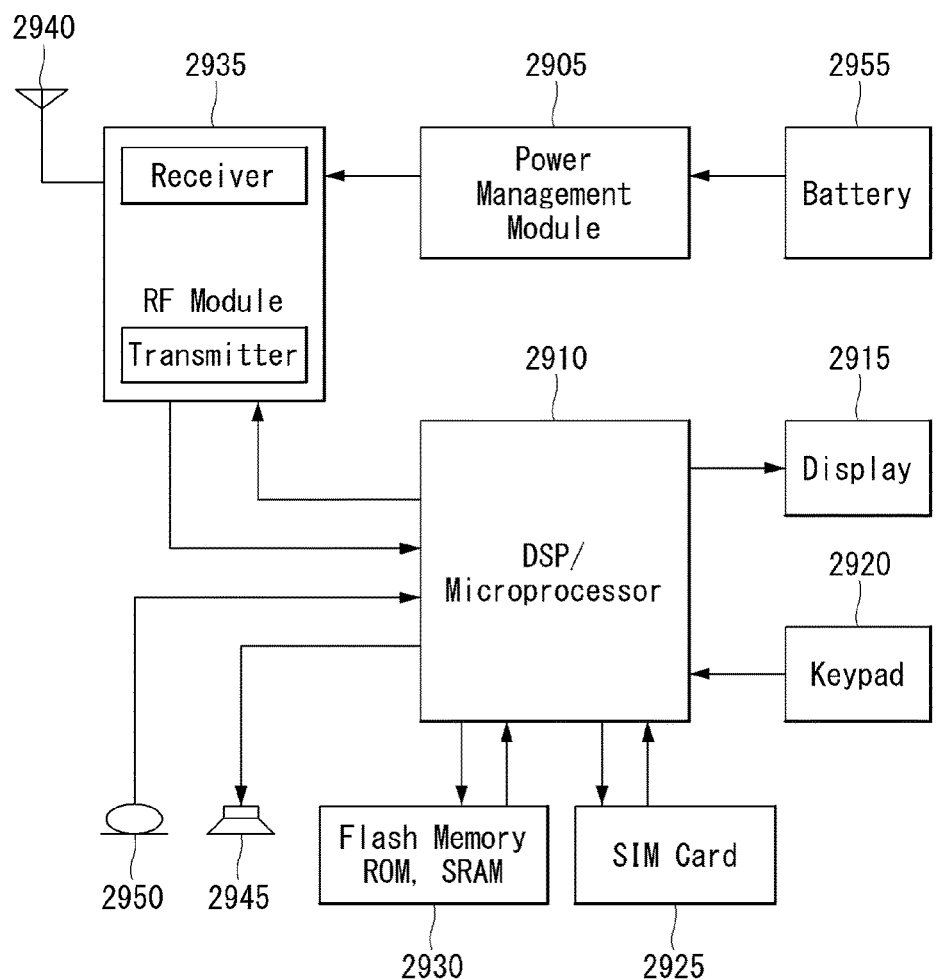
FIG. 29 shows a block diagram of a communication device according to an embodiment of the present invention.

FIG. 29 shows a block diagram of a communication device according to an embodiment of the present invention.

In particular, FIG. 29 is a diagram illustrating the UE of FIG. 28 in more detail.

Referring to FIG. 29, the UE may be configured to include a processor (or a Digital Signal Processor (DSP)) 2910, an RF module (or an RF unit 2935), a power management module 2905, an antenna 2940, a battery 2955, a display 2915, a keypad 2920, memory 2930, a Subscriber Identification Module (SIM) card 2925 (optional), a speaker 2945, and a microphone 2950. The UE may further include a single antenna or multiple antennas.

The processor 2910 implements the functions, processes and/or methods proposed in FIGS. 1 to 27. The layers of wired/wireless radio interface protocols may be implemented by the processor 2910.

The memory 2930 is connected to the processor 2910 and stores information relates to the operations of the processor 2910. The memory 2930 may be placed inside or outside the processor 2910 and connected to the processor 2910 by various well-known means.

A user inputs command information, such as a telephone number, by pressing (or touching) a button of the keypad 2920 or by voice activation using the microphone 2950, for example. The processor 2910 processes proper functions, such as receiving such command information and making a phone call to a telephone number. Operational data may be extracted from the SIM card 2925 or the memory 2930. Furthermore, the processor 2910 may recognize a user and display command information or driving information on the display 2915 for convenience.

The RF module 2935 is connected to the processor 2910 and sends and/or receives RF signals. The processor 2910 delivers command information to the RF module 2935 in order to initiate communication, for example, so that a radio signal forming voice communication data is transmitted. The RF module 2935 includes a receiver and a transmitter in order to send and receive radio signals. The antenna 2940 functions to send and receive radio signals. When a radio signal is received, the RF module 2935 may deliver the radio signal and convert the radio signal into a baseband signal so that it is processed by the processor 2910. The processed signal may be converted into audible or readable information output through the speaker 2945.

In the aforementioned embodiments, the elements and characteristics of the present invention have been combined in specific forms. Each of the elements or characteristics should be considered to be optional unless otherwise described explicitly. Each of the elements or characteristics may be implemented without being combined with other elements or characteristics. Furthermore, some of the elements and/or the characteristics may be combined to form an embodiment of the present invention. Order of the operations described in connection with the embodiments of the present invention may be changed. Some of elements or characteristics in an embodiment may be included in another embodiment or may be replaced with corresponding elements or characteristics in another embodiment. It is evident that in the claims, claims not having an explicit citation relation may be combined to form one or more embodiments or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

The UE reachability monitoring methods in the wireless communication systems according to the embodiments of the present invention have been described assuming that they are applied to 3GPP LTE/LTE-A systems, but may be applied to various wireless communication systems in addition to the 3GPP LTE/LTE-A systems.

What is claimed is:

1. A method for monitoring a user equipment (UE) in an extended Discontinuous Reception (DRX) mode in a wireless communication system, the method performed by a Mobility Management Entity (MME) device, the MME device including a transceiver, a processor and a memory, the method comprising:
   receiving a first message from a Home Subscriber Server (HSS), the first message including a maximum response time, the maximum response time indicating a time during which the UE stays reachable in order to allow a server to deliver downlink data;
   after receiving the first message, monitoring the UE in the extended DRX mode for when the UE will become reachable; and
   based on the monitoring, sending a second message to a Service Capability Exposure Function (SCEF) regarding UE reachability, the second message being transmitted in consideration of the maximum response time.

2. The method of claim 1, wherein the extended DRX mode is a function for reducing the UE's power consumption by monitoring a physical channel to receive a paging message at specific period dependent on an extended DRX cycle value,
   wherein the extended DRX cycle value is configured to a maximum of several tens of minutes greater than a legacy DRX cycle value.

3. The method of claim 1, wherein the SCEF is an entity in the wireless communication system to provide an Application Program Interface (API) for the server.

4. The method of claim 1, wherein the maximum response time is used to determine how early the second message should be transmitted before a paging occasion of the UE.

5. The method of claim 1, wherein the second message is sent to the SCEF based on when the UE enters a connected mode.

6. The method of claim 1, wherein the maximum response time is configured so that downlink data can be transmitted from a server to the UE based on when the UE will become reachable.

7. The method of claim 1, wherein the first message includes an immediate delivery required parameter instructing the UE to immediately transition from a discontinued state to a connected state.

8. A Mobility Management Entity (MME) device for monitoring user equipment (UE) reachability in a wireless communication system, the MME comprising:

a memory;
a transceiver communication module configured to send and receive signals; and
a processor configured to control the communication module,
wherein the processor is configured to:
receive a first message from a Home Subscriber Server (HSS), the first message including a maximum response time, the maximum response time indicating a time during which the UE stays reachable in order to allow a server to deliver downlink data;
after receiving the first message, monitor the UE in the extended DRX mode for when the UE will become reachable; and
based on the monitoring, send a second message to a Service Capability Exposure Function (SCEF) regarding UE reachability, the second message being transmitted in consideration of the maximum response time.

9. The MME device of claim 8, wherein the extended DRX mode is a function for reducing the UE's power consumption by monitoring a physical channel to receive a paging message at specific period dependent on an extended DRX cycle value, wherein the extended DRX cycle value is configured to a maximum of several tens of minutes greater than a legacy DRX cycle value.

10. The MME device of claim 8, wherein the SCEF is an entity m the wireless communication system to provide an Application Program Interface (API) for the server.

11. The MME device of claim 8, wherein the maximum response time is used to determine how early the second message should be transmitted before a paging occasion of the UE.

12. The MME device of claim 8, wherein the second message is sent to the SCEF based on when the UE enters a connected mode.

13. The MME device of claim 8, wherein the maximum response time is configured so that downlink data can be transmitted from a server to the UE based on when the UE will become reachable.

14. The MME device of claim 8, wherein the first message includes an immediate delivery required parameter instructing the UE to immediately transition from a discontinued state to a connected state.

\* \* \* \* \*